US011322976B1

(12) United States Patent
Anderson et al.

(10) Patent No.: US 11,322,976 B1
(45) Date of Patent: May 3, 2022

(54) DIAGNOSTIC TECHNIQUES FOR MONITORING PHYSICAL DEVICES AND RESOLVING OPERATIONAL EVENTS

(71) Applicant: SAS Institute Inc., Cary, NC (US)

(72) Inventors: Thomas Dale Anderson, Peoria, AZ (US); Priyadarshini Sharma, Bellevue, WA (US); Mark Joseph Konya, Innsbrook, MO (US); James M. Caton, Ave Maria, FL (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/501,218

(22) Filed: Oct. 14, 2021

Related U.S. Application Data

(60) Provisional application No. 63/150,507, filed on Feb. 17, 2021, provisional application No. 63/186,053, filed on May 7, 2021.

(51) Int. Cl.
*H02J 13/00* (2006.01)
*G06N 3/04* (2006.01)
*G06K 9/62* (2022.01)

(52) U.S. Cl.
CPC ...... *H02J 13/00002* (2020.01); *G06K 9/6262* (2013.01); *G06N 3/04* (2013.01); *H02J 13/00034* (2020.01)

(58) Field of Classification Search
CPC .......... H02J 13/00002; H02J 13/00034; G06K 9/6262; G06N 3/04
See application file for complete search history.

(56) References Cited

U.S. PATENT DOCUMENTS 5,995,916 A * 11/1999 Nixon ................... G05B 15/02
700/117
7,263,632 B2 * 8/2007 Ritz ................... G06F 11/0709
714/25

(Continued)

FOREIGN PATENT DOCUMENTS

| AU | 2010230857 B2 | 5/2015 |
|----|---------------|--------|
| CN | 106055885 B | 12/2018 |
| IN | 361118 B | 3/2021 |

OTHER PUBLICATIONS

Aggarwal, "Chapter 1: High-dimensional Outlier Detection: The Subspace Method", Springer, Outlier Analysis, Chapter 5, 2013, 76 pages.

(Continued)

*Primary Examiner* — Ramesh B Patel
(74) *Attorney, Agent, or Firm* — Kilpatrick Townsend & Stockton LLP

(57) ABSTRACT

Operational events associated with a target physical device can be detected for mitigation by implementing some aspects described herein. For example, a system can apply a sliding window to received sensor measurements at successive time intervals to generate a set of data windows. The system can determine a set of eigenvectors associated with the set of data windows by performing principal component analysis on a set of data points in the set of data windows. The system can determine a set of angle changes between pairs of eigenvectors. The system can generate a measurement profile by executing an integral transform on the set of angle changes. One or more trained machine-learning models are configured to detect an operational event associated with the target physical device based on the measurement profile and generate an output indicating the operational event.

30 Claims, 20 Drawing Sheets

(56) References Cited

U.S. PATENT DOCUMENTS

| | | | |
|---|---|---|---|
| 8,744,124 B2* | 6/2014 | Venkatesh | G06V 20/52 |
| | | | 382/103 |
| 10,346,621 B2* | 7/2019 | AthuluruTlrumala | H04W 8/18 |
| 10,418,811 B2* | 9/2019 | Konya | H02J 13/0006 |
| 10,605,885 B2* | 3/2020 | Robinson | G01R 33/56563 |
| 10,956,253 B2* | 3/2021 | Della Corte | G06F 11/3452 |
| 11,079,744 B2* | 8/2021 | Chauvet | H04L 12/46 |
| 2015/0269617 A1* | 9/2015 | Mikurak | G06Q 50/12 |
| | | | 705/14.54 |
| 2016/0095013 A1* | 3/2016 | Faivishevsky | H04Q 9/00 |
| | | | 370/252 |
| 2020/0052993 A1* | 2/2020 | Liu | H04L 41/064 |
| 2020/0387747 A1 | 12/2020 | Cha et al. | |
| 2021/0306201 A1* | 9/2021 | Wang | G06F 16/2228 |

OTHER PUBLICATIONS

Akoglu et al., "Graph Based Anomaly Detection and Description: A Survey", Data Mining and Knowledge Discovery, vol. 29, No. 3, Apr. 2014, 68 pages.

Heinemann, "Anomaly Detection in Networks by their Laplacians' Divergence Measures", School of Computer Science and Engineering, The Hebrew University of Jerusalem, Jan. 30, 2010, 66 pages.

Huang et al., "In-Network PCA and Anomaly Detection", Advances in Neural Information Processing Systems 19, 2006, 8 pages.

Kriegel et al., "Outlier Detection Techniques", Society of Indian Automobile Manufacturers International Conference on Data Mining, Database System Groups, 2010, 73 pages.

Kurt et al., "Real-Time Nonparametric Anomaly Detection in High-Dimensional Settings", arXiv:1809.05250v1, Available Online at: https://arxiv.org/abs/1809.05250, Sep. 14, 2018, 29 pages.

Lee et al., "Anomaly Detection via Online Over-Sampling Principal Component Analysis", Journal of Institute of Electrical and Electronics Engineers Transactions on Knowledge and Data Engineering, vol. 25, No. 7, Jul. 2013, pp. 1460-1470.

O'Reilly, "Anomaly Detection in Non-Stationary and Distributed Environments", Submitted for the Degree of Doctor of Philosophy from the University of Surrey, Nov. 2014, 173 pages.

Teixeira et al., "Data Stream Anomaly Detection through Principal Subspace Tracking", Proceedings of the Association for Computing Machinery Symposium on Applied Computing, Mar. 22-26, 2010, pp. 1609-1616.

Wang et al., "High Dimensional Change Point Estimation via Sparse Projection", Journal of the Royal Statistical Methodology Series B, vol. 80, No. 1, Jan. 2018, pp. 57-83.

Zhang et al., "An Angle-Based Subspace Anomaly Detection Approach to High-Dimensional Data: With an Application to Industrial Fault Detection", Reliability Engineering and System Safety, vol. 142, Oct. 2015, pp. 482-497.

* cited by examiner

DIAGNOSTIC TECHNIQUES FOR MONITORING PHYSICAL DEVICES AND RESOLVING OPERATIONAL EVENTS

REFERENCE TO RELATED APPLICATION

This claims the benefit of priority under 35 U.S.C. § 119(e) to U.S. Provisional Patent Application No. 63/150,507, filed Feb. 17, 2021, and to U.S. Provisional Patent Application No. 63/186,053, filed May 7, 2021, the entirety of each of which is hereby incorporated by reference herein.

TECHNICAL FIELD

The present disclosure relates generally to diagnostic systems for monitoring the operation of physical devices. More specifically, but not by way of limitation, this disclosure relates to diagnostic systems usable for detecting and resolving operational events associated with physical devices.

BACKGROUND

Electrical grids can include tens of thousands or even hundreds of thousands of distribution transformers to provide electrical power to consumers. But these transformers are vulnerable to various factors like weather fluctuations, component degradation, power surges, etc. These and other factors can lead to failures of the transformers and other parts of the electrical grid. By some measurements, it is estimated that the average electrical distribution grid experiences upwards of 2000 transformer failures each year, interrupting the power supply to sometimes hundreds of thousands or millions of downstream consumers. This can result in substantial operational and maintenance costs for the utility, monetary loss for the downstream users, reduced user satisfaction, and safety hazards. It would be therefore desirable to prevent or better mitigate these types of technical failures.

SUMMARY

One example of the present disclosure includes a system having one or more processors and one or more memory devices including instructions that are executable by the one or more processors for causing the one or more processors to perform operations. The operations can include receiving sensor measurements collected from a plurality of sensors associated with a target physical device, the sensor measurements including data points spanning a period of time. The operations can include applying a sliding window to the sensor measurements at successive time intervals to generate a plurality of data windows, each data window in the plurality of data windows having a fixed number of consecutive data points from the sensor measurements. The operations can include determining a plurality of eigenvectors associated with the plurality of data windows by performing principal component analysis on a plurality of data points in the plurality of data windows. The operations can include determining a plurality of angle changes between pairs of eigenvectors in the plurality of eigenvectors, each of the pairs of eigenvectors corresponding to a respective pair of successive data windows in the plurality of data windows. The operations can include generating a measurement profile by executing an integral transform on the plurality of angle changes, the measurement profile including frequencies associated with the plurality of angle changes. The operations can include providing the measurement profile as an input to one or more trained machine-learning models, the one or more trained machine-learning models being configured to detect an operational event associated with the target physical device based on the measurement profile and generate an output indicating the operational event. The operations can include receiving the output from the one or more trained machine-learning models. The operations can include generating an event notification based on the output, the event notification indicating the operational event detected in relation to the target physical device. The operations can include transmitting the event notification as one or more electronic signals to one or more electronic devices.

Another example of the present disclosure can include a method. The method can include receiving sensor measurements collected from a plurality of sensors associated with a target physical device, the sensor measurements including data points spanning a period of time. The method can include applying a sliding window to the sensor measurements at successive time intervals to generate a plurality of data windows, each data window in the plurality of data windows having a fixed number of consecutive data points from the sensor measurements. The method can include determining a plurality of eigenvectors associated with the plurality of data windows by performing principal component analysis on a plurality of data points in the plurality of data windows. The method can include determining a plurality of angle changes between pairs of eigenvectors in the plurality of eigenvectors, each of the pairs of eigenvectors corresponding to a respective pair of successive data windows in the plurality of data windows. The method can include generating a measurement profile by executing an integral transform on the plurality of angle changes, the measurement profile including frequencies associated with the plurality of angle changes. The method can include providing the measurement profile as an input to one or more trained machine-learning models, the one or more trained machine-learning models being configured to detect an operational event associated with the target physical device based on the measurement profile and generate an output indicating the operational event. The method can include receiving the output from the one or more trained machine-learning models. The method can include generating an event notification based on the output, the event notification indicating the operational event detected in relation to the target physical device. The method can include transmitting the event notification as one or more electronic signals to one or more electronic devices. Some or all of the method steps may be implemented by one or more processors.

Yet another example of the present disclosure can include a non-transitory computer-readable medium comprising program code that is executable by one or more processors for causing the processor to perform operations. The operations can include receiving sensor measurements collected from a plurality of sensors associated with a target physical device, the sensor measurements including data points spanning a period of time. The operations can include applying a sliding window to the sensor measurements at successive time intervals to generate a plurality of data windows, each data window in the plurality of data windows having a fixed number of consecutive data points from the sensor measurements. The operations can include determining a plurality of eigenvectors associated with the plurality of data windows by performing principal component analysis on a plurality of data points in the plurality of data windows. The operations can include determining a plurality of angle changes between pairs of eigenvectors in the plurality of eigenvectors, each of the pairs of eigenvectors corresponding to a respective pair of successive data windows in the plurality of data windows. The operations can include generating a measurement profile by executing an integral transform on the plurality of angle changes, the measurement profile including frequencies associated with the plurality of angle changes. The operations can include providing the measurement profile as an input to one or more trained machine-learning models, the one or more trained machine-learning models being configured to detect an operational event associated with the target physical device based on the measurement profile and generate an output indicating the operational event. The operations can include receiving the output from the one or more trained machine-learning models. The operations can include generating an event notification based on the output, the event notification indicating the operational event detected in relation to the target physical device. The operations can include transmitting the event notification as one or more electronic signals to one or more electronic devices.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
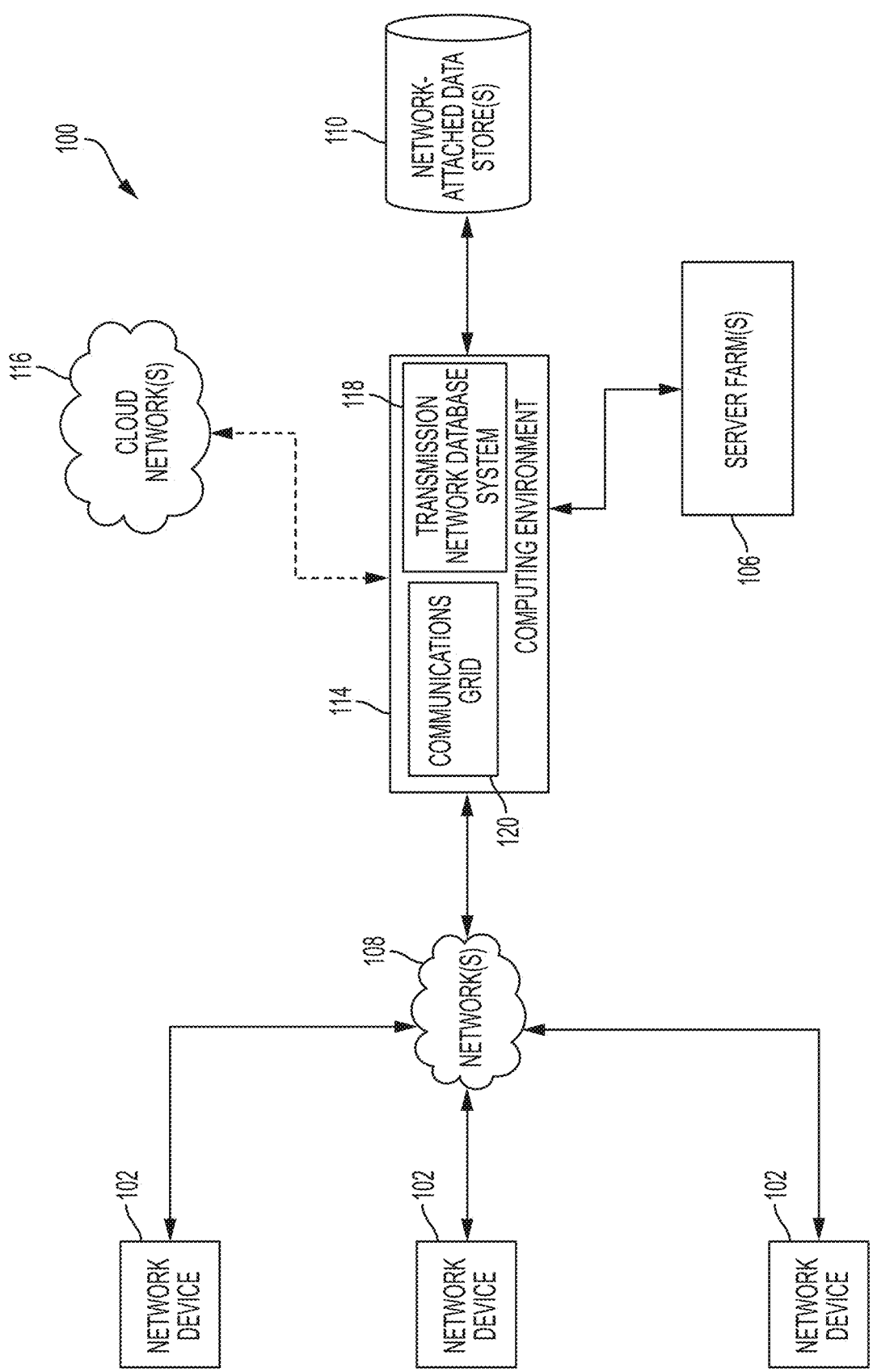
FIG. 1 depicts a block diagram of an example of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Electrical-grid transformers and other types of physical devices can experience operational events for a variety of reasons. The operational events can negatively impact the performance of a physical device or the system containing the physical device. For example, operational events like anomalies and degradations can negatively affect the physical device's performance. An anomaly is a deviation from what is standard or normal. Degradation is different from an anomaly, in that degradation is a decline in the physical device's performance over a period of time. In many cases, such operational events can lead to breakdowns, failures, or otherwise suboptimal performance of the physical devices. Failure to timely detect anomalies and degradations can exacerbate such problems and can make it more difficult, time-consuming, and expensive to remedy them. Not only can these operational events impact the physical device's performance, but they may also impact the performance of the system containing the physical device. For example, failure to timely detect anomalies and degradations of a physical device can create cascading effects that negatively impact operation of part or all of the system. In some cases, operational events like anomalies can result in hazardous conditions (e.g., when the physical device becomes volatile, unstable, or overheated) for operators of the physical devices and surrounding workers. Despite these issues, some systems lack diagnostic tools (e.g., sensors and corresponding software) to monitor the condition or operation of physical devices and those physical devices remain relatively unmonitored as a result.

Certain aspects and features of the present disclosure can overcome one or more of the abovementioned problems by providing a detection system for detecting and mitigating operational events associated with physical devices. In some examples, the detection system can receive a dataset including sensor measurements, where the sensor measurements are collected from one or more sensors associated with a target physical device. The dataset may be time series data or another type of data including data points spanning a period of time. The detection system can then decompose the dataset and compute indicators that reflect the variability in the sensor measurements. One example of the indicators can include angle changes between pairs of eigenvectors, as described in greater detail later on. The detection system can then convert these indicators from time domain to frequency domain to generate a frequency profile, which can be referred to herein as a measurement profile. The detection system can provide the measurement profile as an input to one or more trained machine-learning models. The detection system may also provide other inputs to the one or more trained machine-learning models. The one or more trained machine-learning models can detect an operational event associated with the target physical device based on the inputs and generate an output indicating a detected operational event. Upon receiving the output from the one or more trained machine-learning models, the detection system can generate and output an event notification indicating the operational event detected in relation to the target physical device.

In some instances, the detection system can transmit the event notification to a system administrator so that some manual corrective action can be taken in time to mitigate certain problems. Alternatively, the detection system can automatically implement one or more countermeasures or corrective actions in response to detected operational events in order to mitigate such problems. Either way, the detection system may distinguish among different types of operational events and provide the event classification in the notification. This may allow for more appropriate mitigation measures to be implemented.

In some examples, the detection system can compute the indicators associated with the sensor measurements and generate the measurement profile as follows. First, the detection system can apply a sliding window to the sensor measurements at successive time intervals to generate multiple data windows. The detection system can then perform principal component analysis (PCA) on data points in the data windows to determine eigenvectors corresponding to the data windows. Having determined the eigenvectors, the detection system can determine angle changes between successive pairs of the eigenvectors. The angle changes may serve as one type of indicator in this example. The detection system can then execute an integral transform (e.g., a Fourier transform) on the angle changes to generate the measurement profile. Alternatively or in addition, the detection system can determine absolute angle values corresponding to the eigenvectors by comparing each eigenvector to a baseline vector. The absolute angle values may serve as another type of indicator in this example. The detection system can then provide the measurement profile, the sensor measurements, the absolute angle values, the angle changes, or any combination thereof, as inputs to the one or more trained machine-learning models. The one or more trained machine-learning models can detect the operational event based on the inputs. More details about the machine-learning models and their training is described later on.

In some examples, the PCA approach used in the above process can be a modified PCA approach that is faster and less computationally intensive than alternative approaches. In general, principal component analysis can involve computing the principal components of a data window and analyzing those principal components. Typically, many principal components are computed for a given data window. But in some examples, the detection system may compute only the first few principal components of a data window and forego computing the rest. For example, the detection system may only determine the first principal component of a data window and may not determine any other principal components of the data window. This can significantly reduce processing times and consumption of computing resources (e.g., processing power and memory), because the processor only computes the smallest amount of information needed to implement the rest of the process and avoids determining other information that may be extraneous.

The techniques described herein can be applied in numerous contexts to a wide variety of physical devices to detect operational events and mitigate the negative impacts thereof. In some cases, the detection system can even detect operational events associated with a target physical device that lacks its own sensors, for example by using sensor measurements collected from one or more other devices that are distinct from but associated with (e.g., connected to or downstream of) the target physical device. For example, the detection system can detect operational events associated with a distribution transformer in an electrical grid based on sensor measurements from electrical meters that draw power from the distribution transformer. Thus, the detection system can even monitor physical devices that may not have their own sensors and therefore may be unable to be monitored using traditional approaches. The processes described herein can also be predictive in some cases. For example, a precursor of an operational event can be detected based on angle changes in principal components before the operational event itself occurs. This may allow for preventative maintenance to be performed to prevent, or reduce the impact of, the operational event. By implementing some techniques described herein, improvements to the technical field of preventative maintenance may be achieved in the form of greater prediction speed and accuracy than may otherwise be possible using conventional preventative techniques.

As one particular example, the techniques described herein can be applied in the context of an electrical grid. In an electrical grid, transformers can experience various kinds of operational events, such as voltage anomalies. Voltage anomalies at distribution transformers usually indicate certain issues associated with the distribution transformers in a distribution grid. In some cases, voltage anomalies can be classified as voltage sag or voltage swell. A voltage sag happens when the root mean square (rms) voltage decreases by between 10% and 90% of the nominal voltage for one-half cycle to one minute. A longer duration of low voltage is called a "sustained sag." When a line-to-ground fault occurs, there may be a voltage sag until the protective switch gear operates. Some accidents in power lines such as lightning or a falling object can be a cause of line-to-ground fault and a voltage sag as a result. Sudden load changes or excessive loads can cause a voltage sag. Depending on the transformer connections, transformers energizing could be another reason for voltage sags. Voltage sags can also arrive from the utility, but most are caused by in-building equipment. In residential homes, voltage sags are sometimes seen when refrigerators, air-conditioners, or furnace fans start up.

Voltage swell is the opposite of voltage sag. Voltage swell, which is a momentary increase in voltage, happens when a heavy load turns off in a power system.

An average electric utility has tens of thousands or even hundreds of thousands of distribution transformers. But the vast majority of distribution transformers do not have any built-in sensors or monitoring capabilities. Detecting causes and effects of voltage anomalies at nodes presided by distribution transformers within a circuit, without monitoring or sensory devices, is a key challenge for utility companies. An electrical distribution grid can experience over 2000 transformer failures each year leading to interruptions in power supply. These interruptions can lead to substantial operational and maintenance costs for the utility, monetary losses for utility users, reduced user satisfaction, and increased exposure to safety hazards.

In some examples, the abovementioned problems may be overcome by employing the techniques described herein. Although the distribution transformers themselves may lack sensors, in some examples smart meters that are associated with a distribution transformer may be used in monitoring the operation of the distribution transformer. The smart meters may be selected for use in the monitoring process given their downstream electrical connection to the transformer. One example of such smart meters can be advanced metering infrastructure (AMI) smart meters, which can monitor power consumption at residential properties or commercial properties. The smart meters can supply the sensor measurements used by the detection system in the abovementioned process for monitoring the distribution transformer.

More specifically, the voltages delivered to smart meters are produced from adjacent distribution transformers. Thus, the smart meters can provide metrics usable to determine net voltages produced by the distribution transformers. Some examples of the present disclosure can leverage existing smart meters already installed within a utility's distribution network to detect operational events (e.g., voltage anomalies) at distribution transformers servicing the smart meters on the same circuit, for example without the addition of other sensors. The processes described herein can generate early warnings of voltage irregularities at distribution transformers. In some instances, voltage anomaly can be a precursor to transformer failure.

Smart meters currently deployed by many utilities provide measurements of electric consumption and network voltage at intervals as short as 15 minutes. Examples of such measurements can include voltage (e.g., in volts (V)), load (e.g., in kilowatts (kW)), energy usage (e.g., in kilowatt hours (kWh)), and apparent power (e.g., in kilovolt amperes (kVA)). The measurements can be aggregated by time stamp and meter to create a time series representing electric voltage at the smart meters. This time series can then be provided (e.g., in substantially real time) to the detection system for use as the input sensor measurements in the techniques described herein. For example, the smart meters can be communicatively coupled via a wired or wireless link to the detection system for providing the time series data to the detection system. Having received the time series, the detection system can then determine the first principal components of successive moving windows in the input sensor measurements. Changes in the magnitude and angle of the first principal components can be computed. These changes can then be transformed into frequency space using an integral transform to create a measurement profile. The measurement profile can be input to one or more machine learning models to predict an event classification category.

In this way, the detection system can detect operational events associated with the distribution transformer, even though the distribution transformer does not have its own attached sensors. In some cases, the operational event may be an anomaly that may precede transformer failure. Detection of such an anomaly can enable administrators of the distribution system to dispatch repair crews to avoid unplanned power interruptions. In other cases, the operational event may be additional load added to the distribution grid, for example, electric vehicles being plugged in for charging.

The detection system can be implemented at any suitable location. In some examples, the detection system can be installed at remote locations in network communication with sensors collecting measurements associated with a target physical device.

Besides the electrical grid, the processes in the present disclosure can also be used in other contexts. For example, the processes described herein can be used for detecting operational events in a system where fiber-optic power meters are deployed for measuring cable TV and internet usage. As another example, the processes described herein can be used for detecting operational events in natural gas systems or water systems where smart meters are deployed for monitoring gas or water consumption by end users.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable in connection with detecting operational events associated with a target physical device according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data to detect operational events associated with a target physical device.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for detecting operational events associated with a target physical device.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for detecting operational events associated with a target physical device. For example, the computing environment 114, a network device 102, or both can implement one or more versions of the processes discussed with respect to any of the figures.

Figure 2:
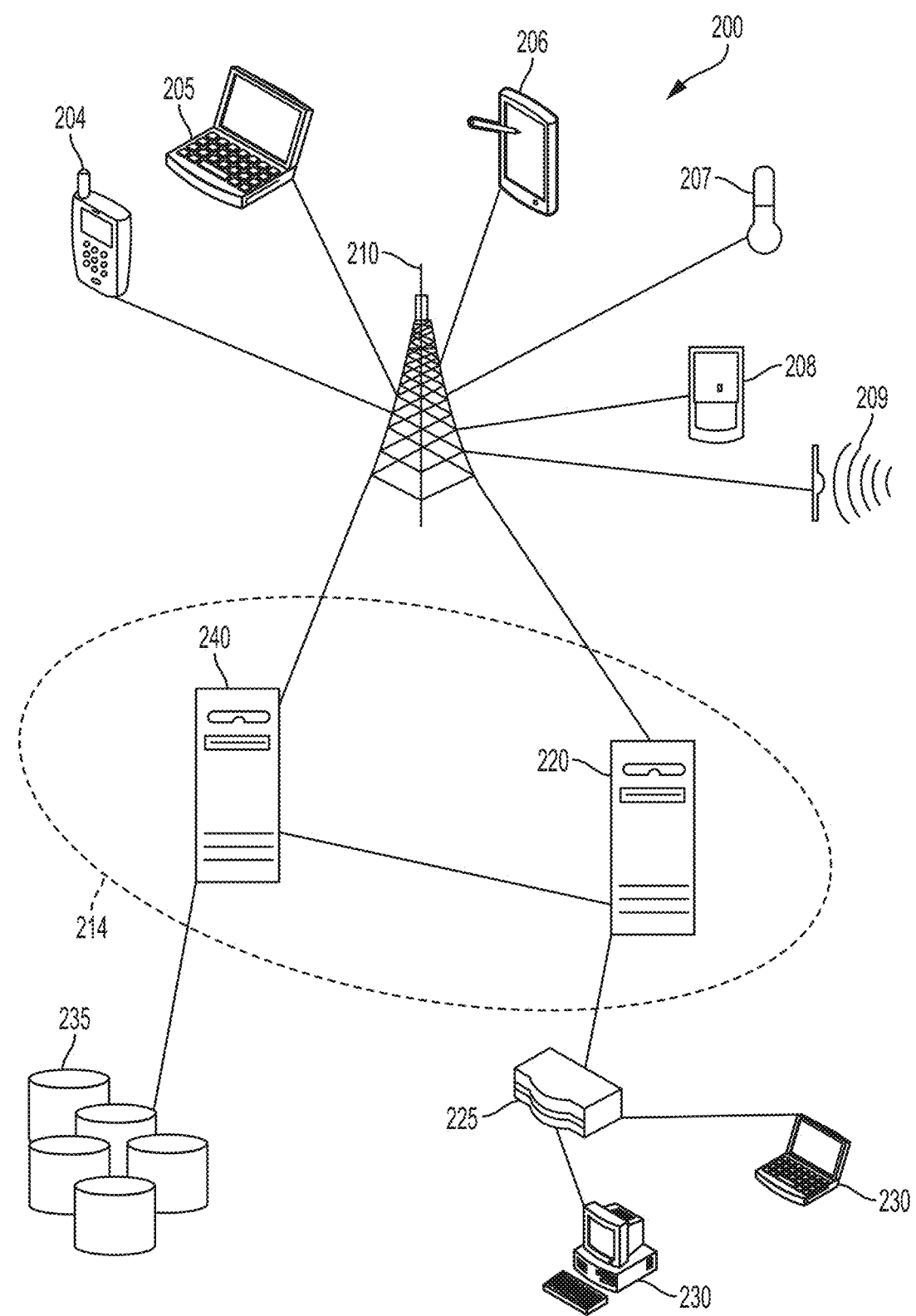
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to detect operational events associated with a target physical device).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project involving detecting operational events associated with a target physical device from data, the computing environment 214 can perform a pre-analysis of the data. The pre-analysis can include determining whether the data is in a correct format for detecting operational events associated with a target physical device and, if not, reformatting the data into the correct format.

Figure 3:
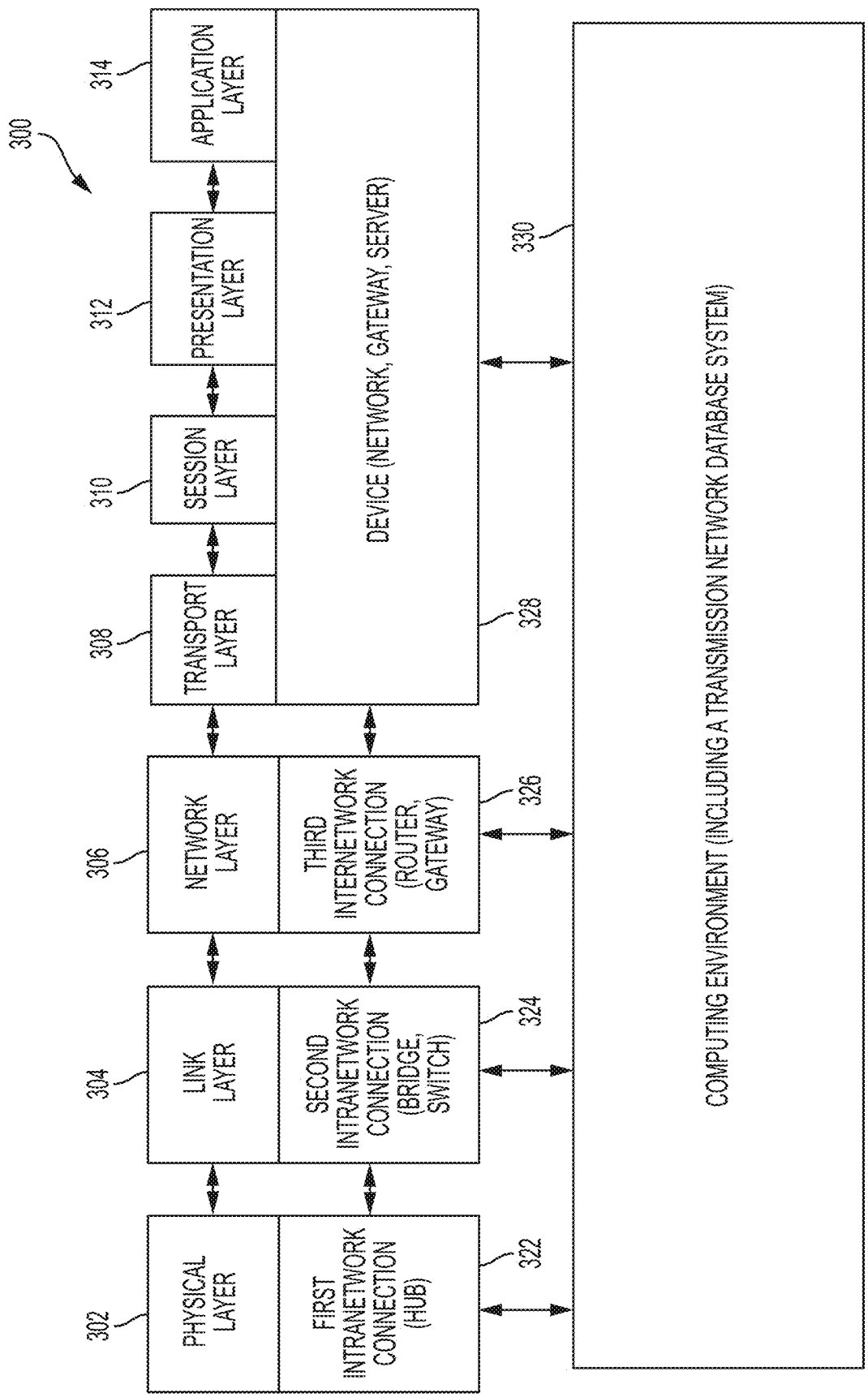
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for detecting operational events associated with target physical device, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for detecting operational events associated with a target physical device.

Figure 4:
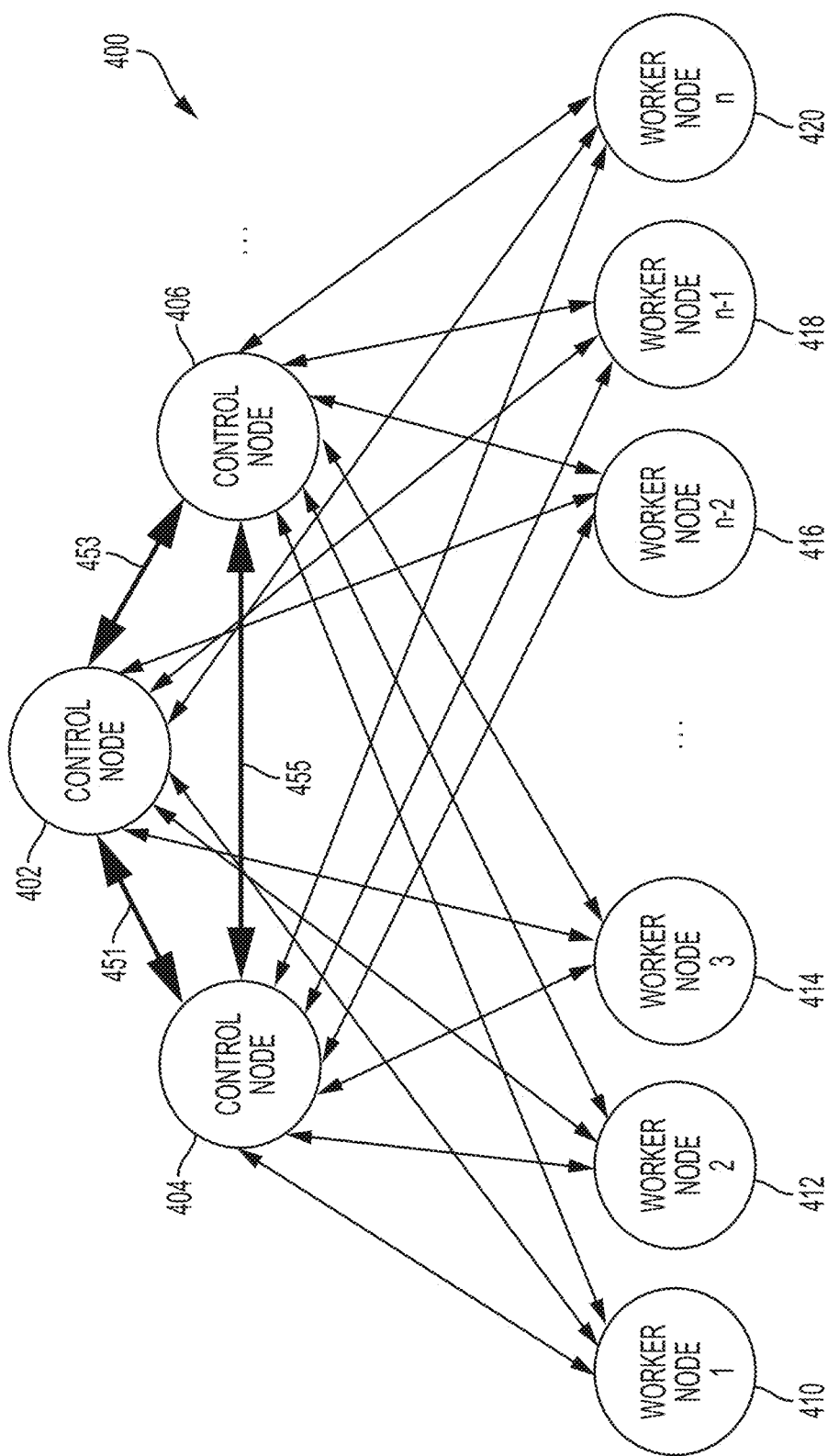
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to detecting operational events associated with a target physical device. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for detecting operational events associated with a target physical device can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may perform its analysis using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to detecting operational events associated with a target physical device.

Figure 5:
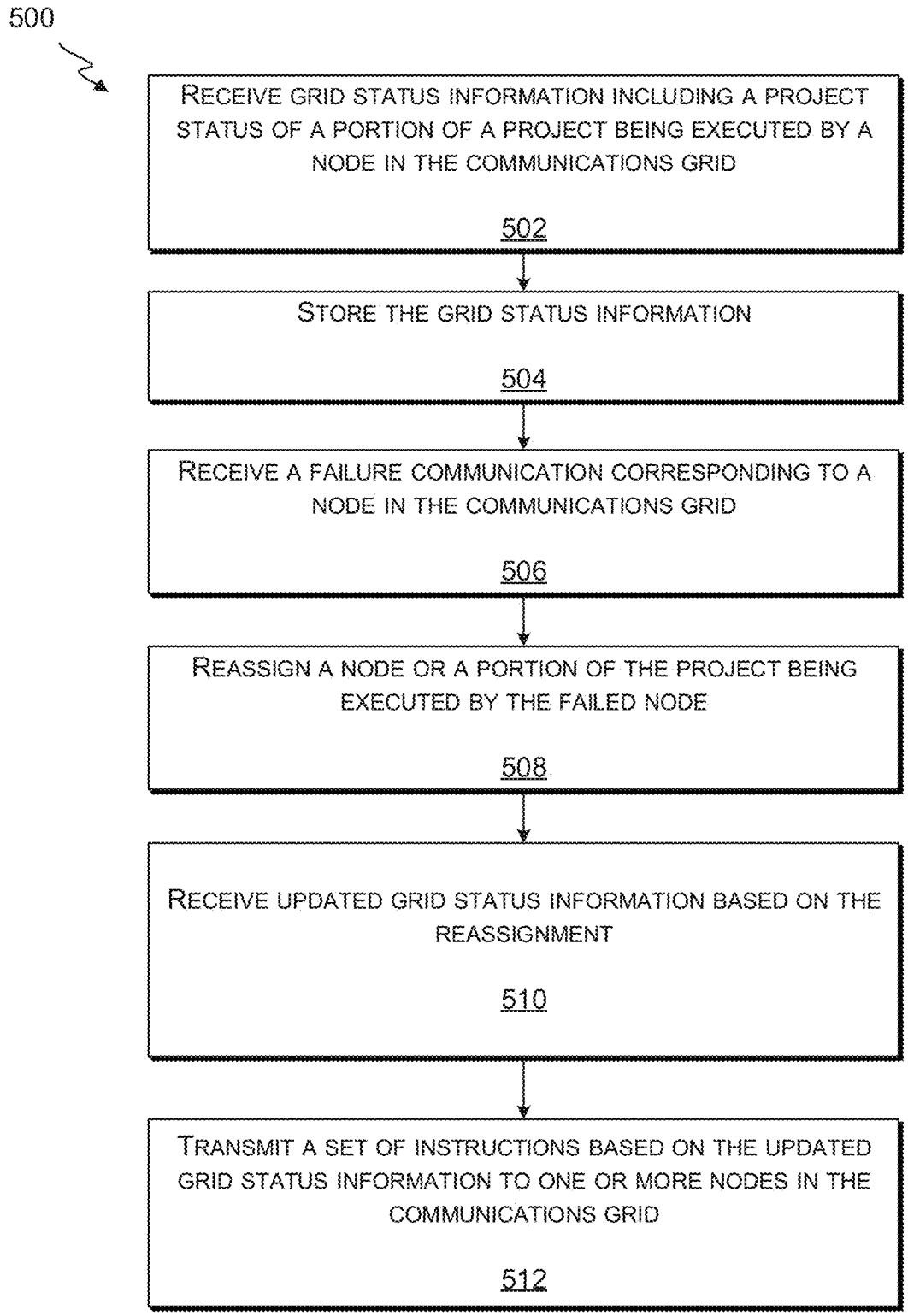
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
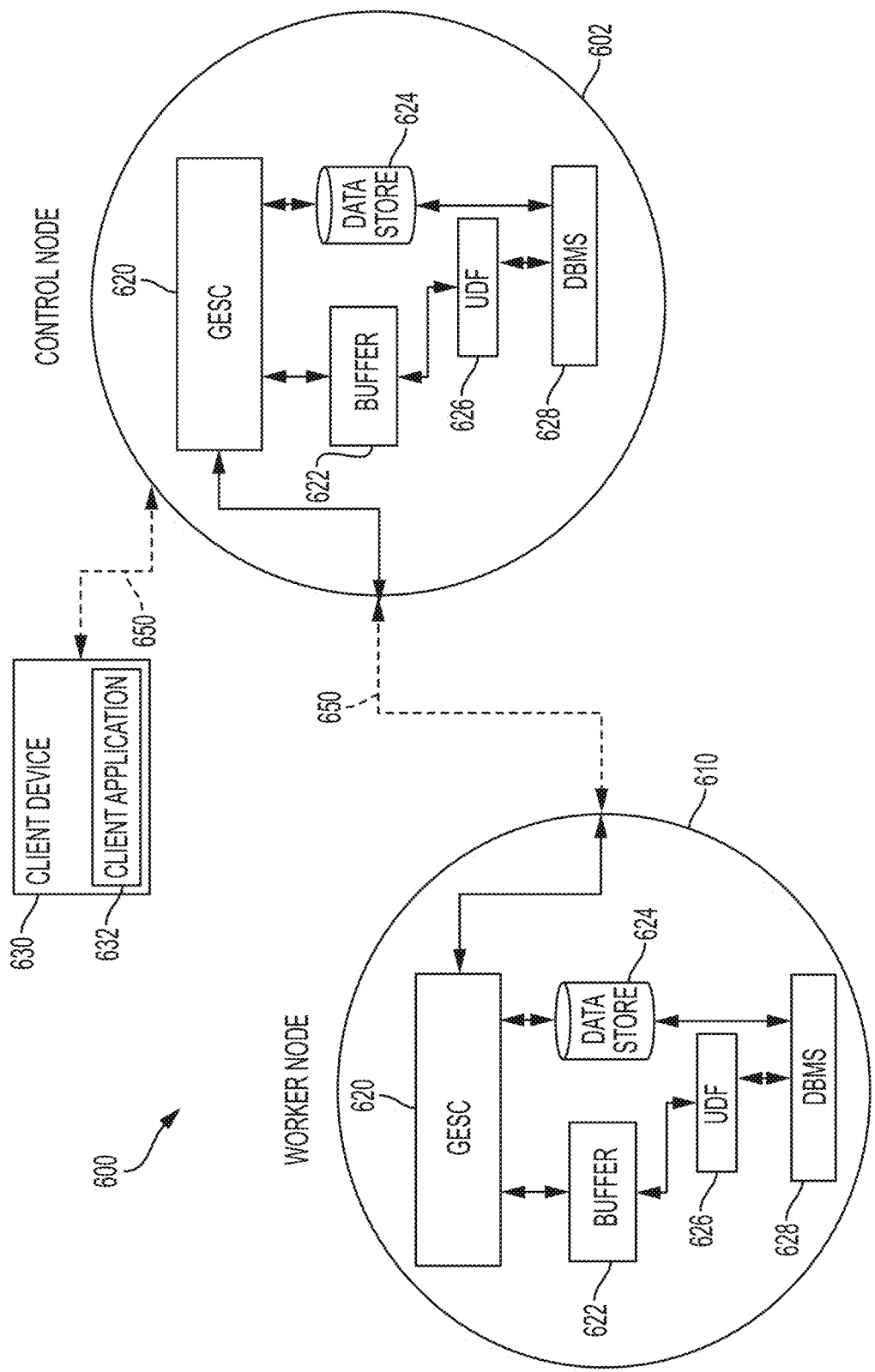
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
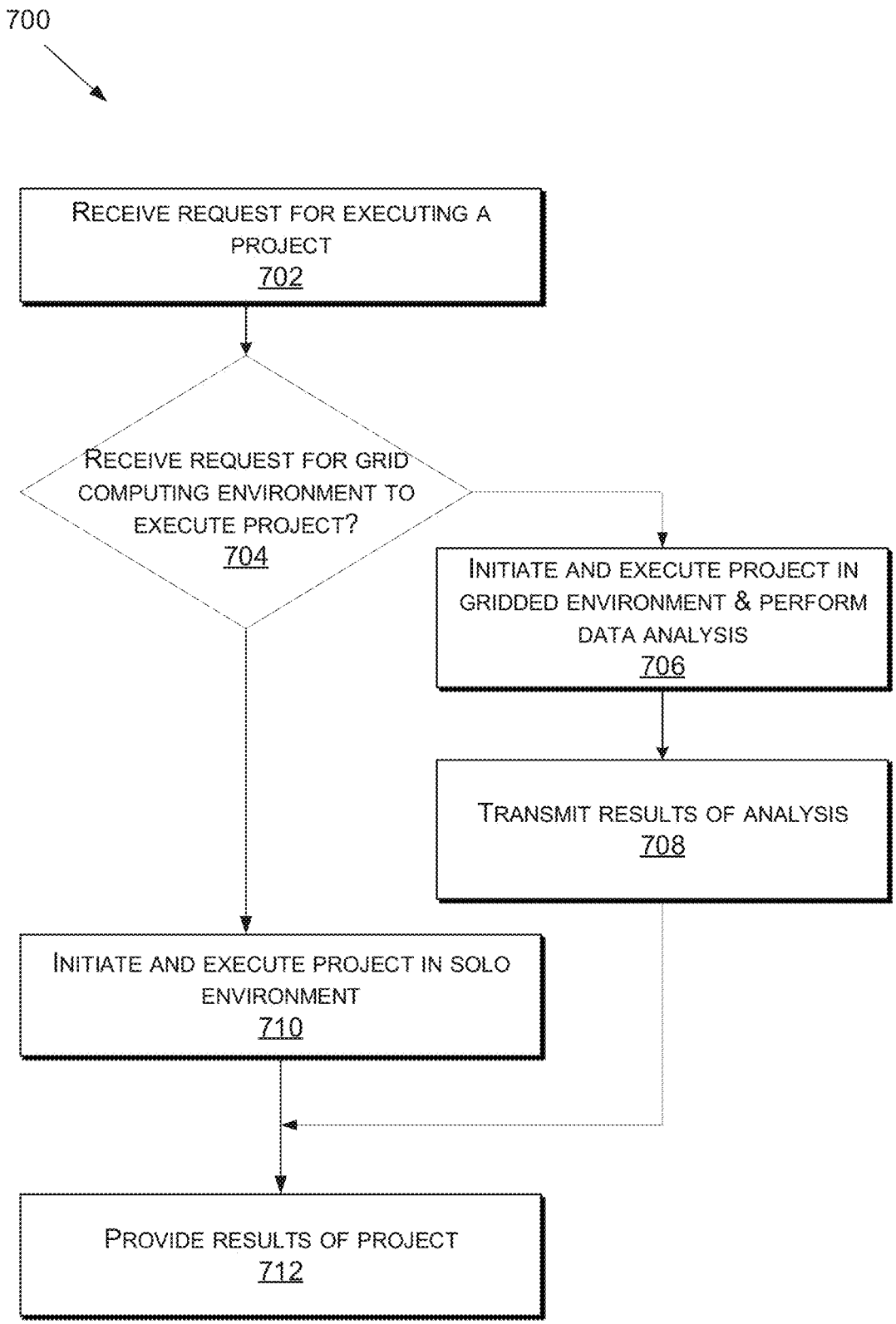
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
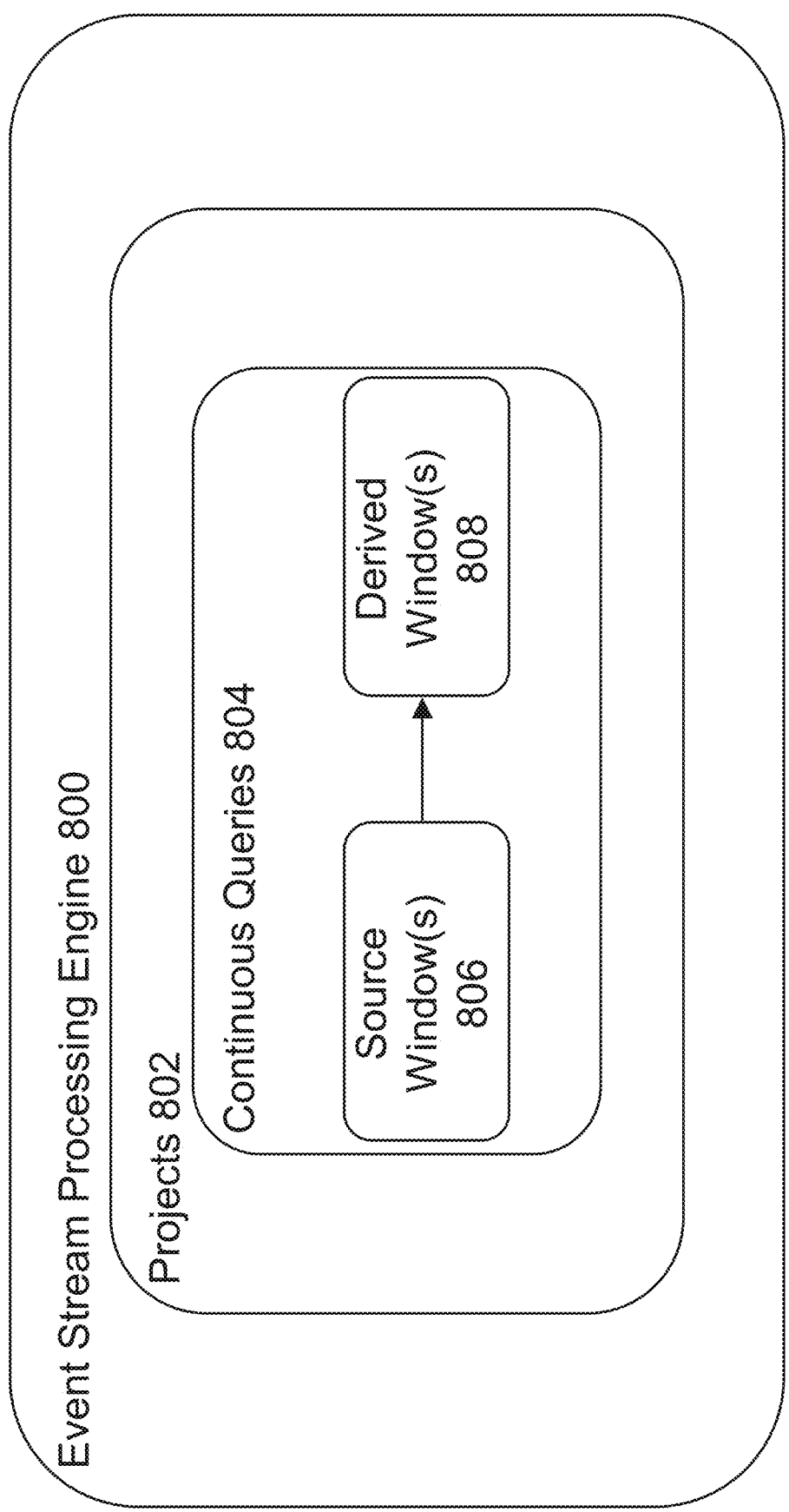
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
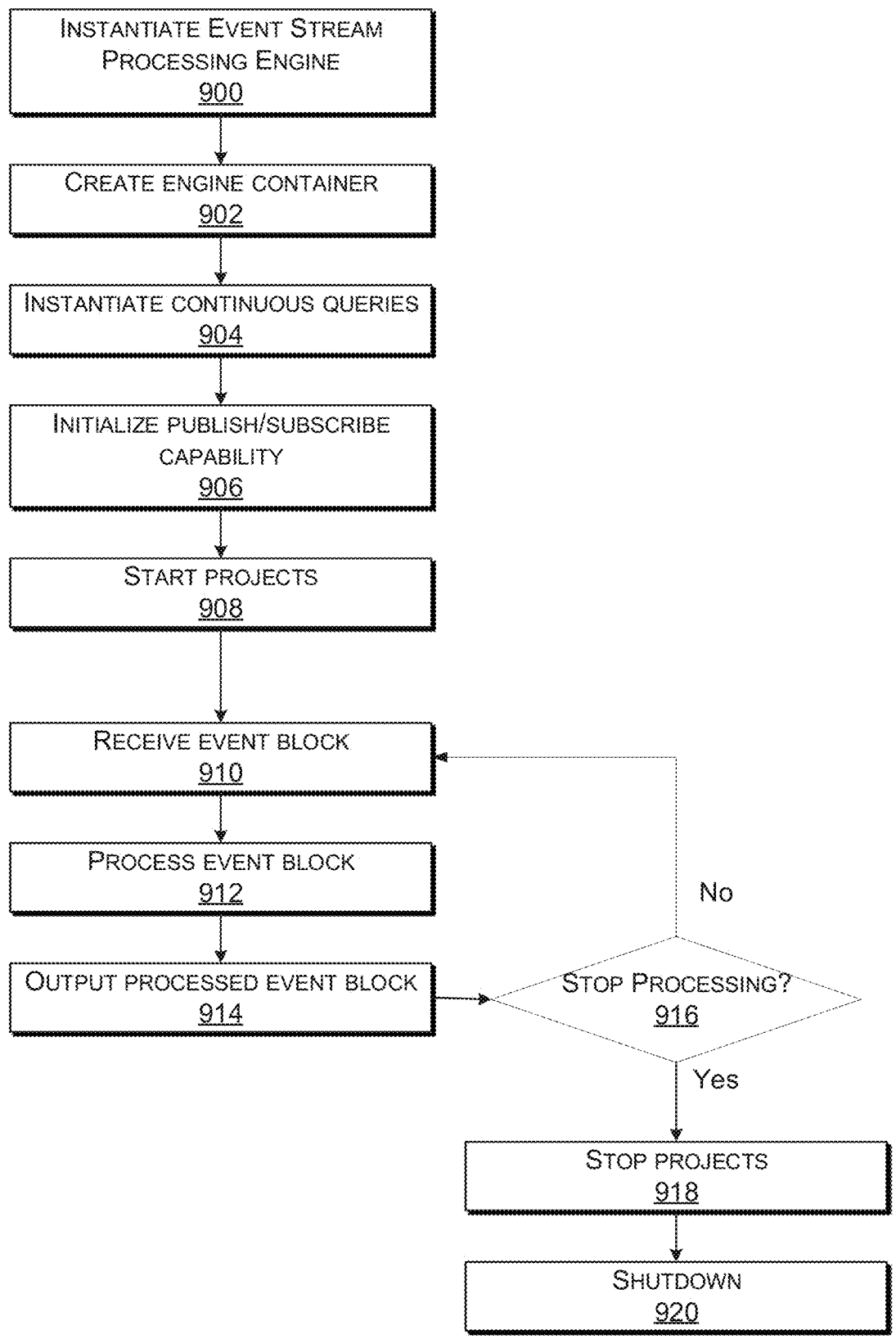
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
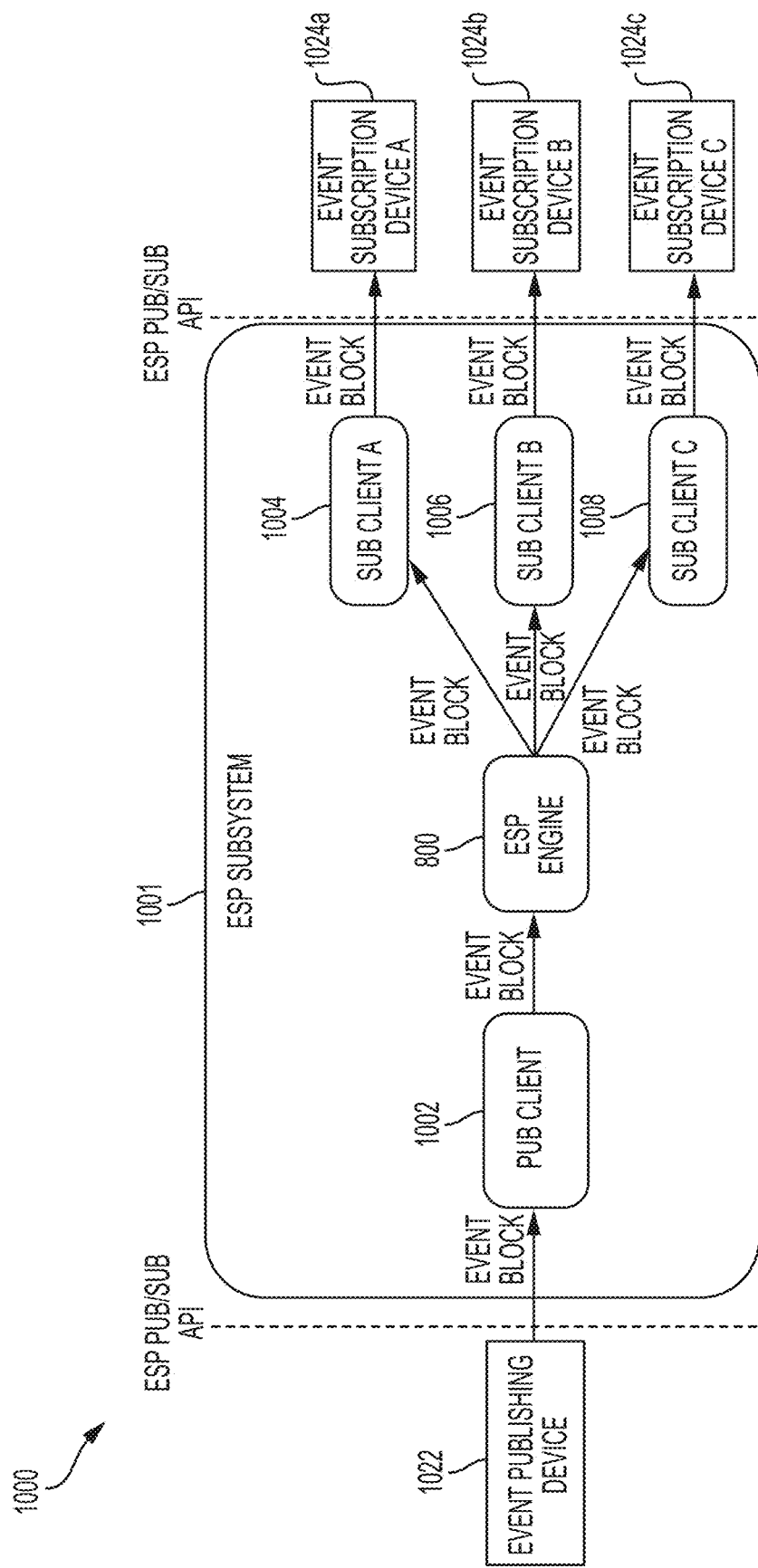
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
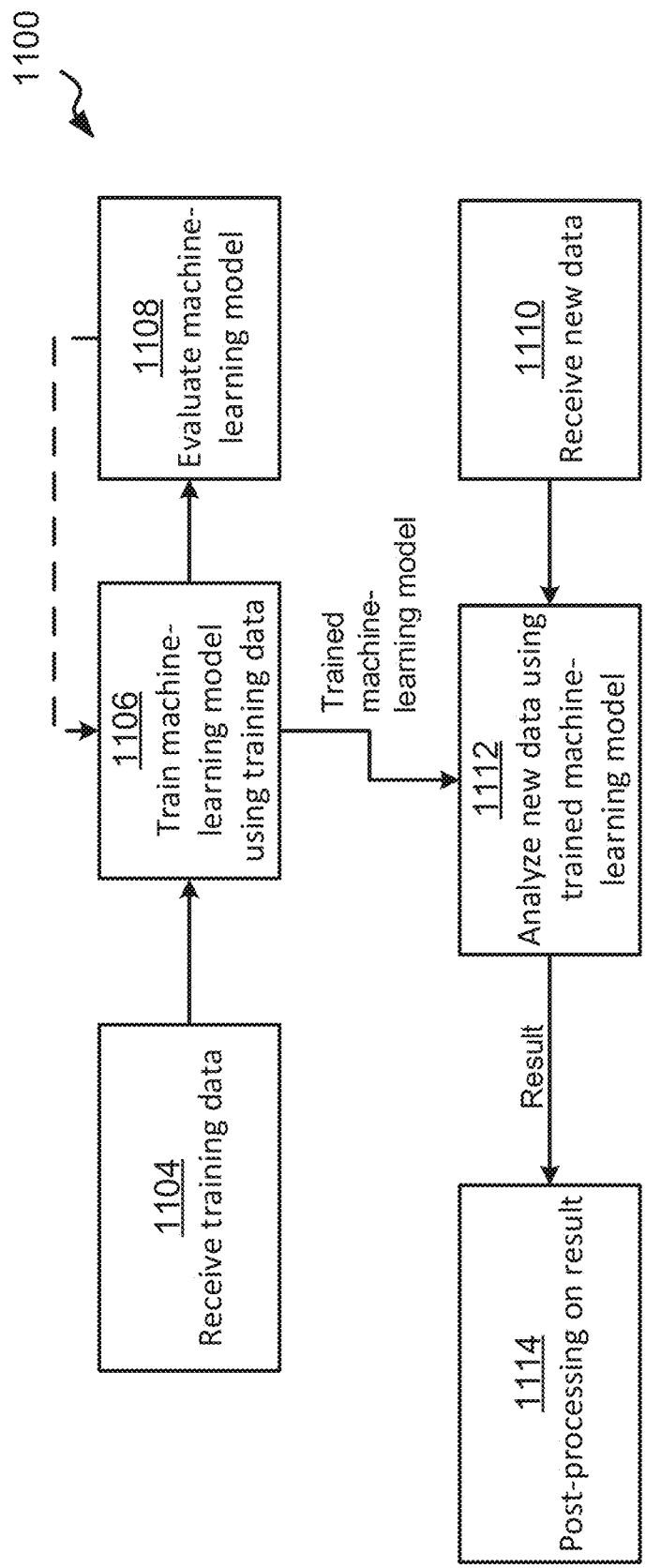
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
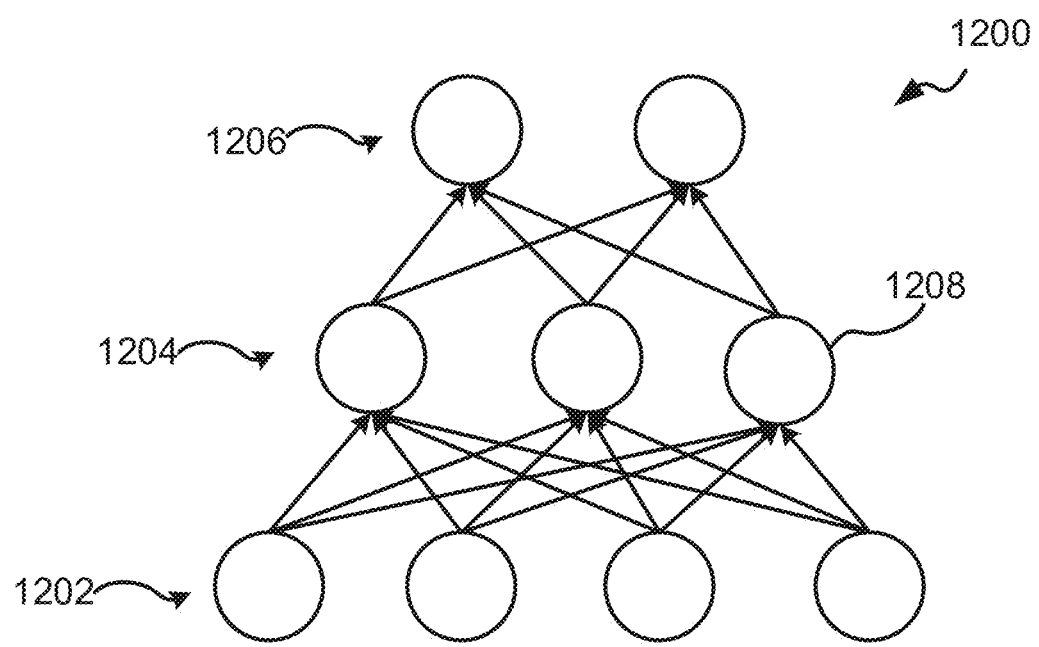
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation.

Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
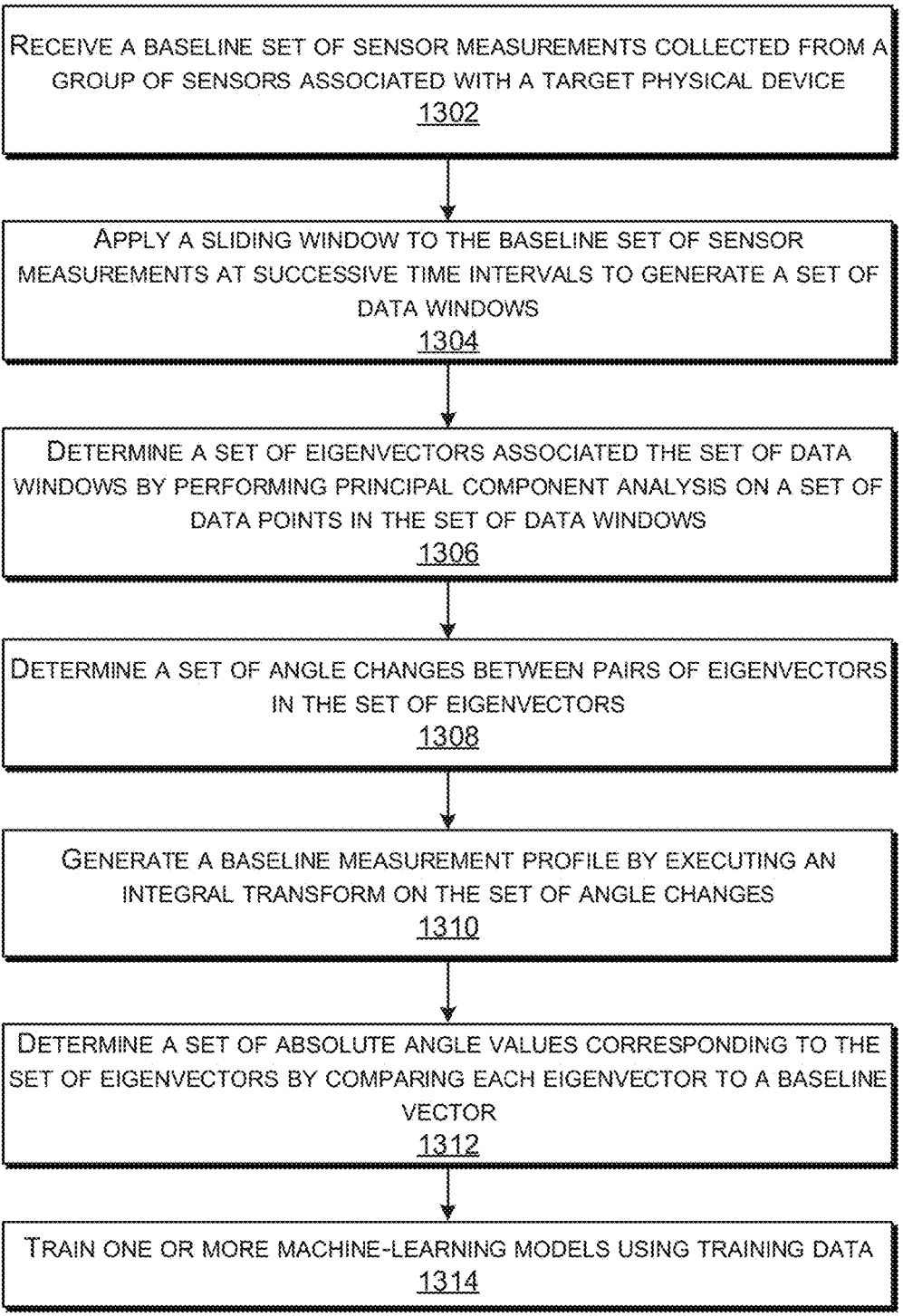
FIG. 13 depicts a flow chart of an example of a process for training one or more machine-learning models using baseline measurement profiles according to some aspects.

FIG. 13 depicts a flow chart of an example of a process for training one or more machine-learning models using baseline measurement profiles according to some aspects. Although FIG. 13 shows a certain number and sequence of operations for illustrative purposes, it will be appreciated that other examples may include more operations, fewer operations, different operations, or a different order of the operations than is shown in FIG. 13.

In block 1302, a processor receives a baseline set of sensor measurements collected from a group of sensors associated with a target physical device. The baseline set of sensor measurements can be historical data or real-time streaming data from the group of sensors. The group of sensors can be included in a group of physical devices. In some embodiments, the group of physical devices are different from the target physical device and configured to be coupled (e.g., electrically or fluidically) to the target physical device. The group of sensors can include any number and combination of the sensor types described above. In some examples, the sensors can be configured for sensing one or more characteristics of the target physical device. This can enable the processor to detect operational events (e.g., anomalies and degradation) associated with the target physical device based on the measurements from the sensors. In some examples, the measurements from the sensors reflect the situation of the target physical device because of their proximity or connection to the target physical device.

The target physical device can include one or more electronic devices, one or more mechanical devices, one or more optical devices, one or more thermal devices, one or more magnetic devices, or any combinations thereof. Examples of such physical devices can include meters, such as electrical meters or flow meters; light sources, such as light bulbs and light emitting diodes; vehicles, such as cars, trains, busses, and airplanes; wind turbines; solar panels; power generators; transformers; heaters or furnaces; gas compressors; water pumps; valves; computers, such as laptop computers, desktop computers, mobile phones, and servers; and network devices, such as switches and routers.

In an example involving an electrical distribution grid, the group of physical devices can be smart meters connected to the electrical distribution grid to monitor power consumption at residential properties or commercial properties. The target physical device can be a distribution transformer that is stepping down the voltage to the level used at the residential properties or commercial properties. The smart meters are electrically coupled to the distribution transformer. The baseline set of sensor measurements from smart meters can include voltage, current, power factor, load, energy consumption, or any combination of these. The smart meters can measure actual energy usage in kilowatt hours (kWh) in 15-minute intervals or other intervals. The smart meters may provide four readings per day for actual energy usage in kWh, including three readings corresponding to three 8-hour blocks (32 intervals per block) and one reading for all 24 hours (96 intervals in total). Additionally or alternatively, the smart meters can provide instantaneous voltage readings in volts (V). In some examples, the smart meters can provide an apparent power reading in kilovolt amperes (kVA). The apparent power may reset every month and be only reported if it exceeds the previous peak.

In block 1304, the processor applies a sliding window to the baseline set of sensor measurements at successive time intervals to generate a set of data windows. Each data window in the set of data windows may have a fixed number of consecutive data points from the baseline set of sensor measurements. The processor can determine a data window by applying a window function to the baseline set of sensor measurements. The window function can have a window length constraining the number of consecutive data points in the baseline set of sensor measurements to be included in a data window. For example, a window length of 9 may generate a data window having 9 consecutive data points from the baseline set of sensor measurements.

The processor can generate a first data window by applying the window function to the baseline set of sensor measurements. The first data window can span a first time period and have a predefined number of consecutive data points from the baseline set of sensor measurements, where the predefined number of consecutive data points depends on the window length associated with the window function. For example, the first data window can span 10 milliseconds (ms) and have 9 data points.

The processor can also generate a second data window by applying the window function to the baseline set of sensor measurements. The second data window can span a second time period that is subsequent to the first time period, thereby making the second time period more current in time than the first time period. The second data window can also have the predefined number of consecutive data points from the baseline set of sensor measurements. For example, the second data window can also span 10 milliseconds (ms) and have 9 data points. Thus, the second data window has at least one data point that is different from the data points in the first data window. That is, the second data window includes at least one data point that is not included in the first data window. The second data window may also have at least one data point that is included in the first data window, such that the second data window is partially overlapping with the first data window.

As one example in the context of an electrical distribution grid, a data point can be a voltage associated with (e.g., a voltage draw on) a transformer at a given instant in time, a window can have any suitable timespan from 30 minutes to 2 hours in length, and one data window can be generated at every sampling interval. If the sampling interval is 15 minutes and a data window is 2 hours in length, the data window can include 8 data points. In this scenario, two consecutive data windows can overlap by 7 data points.

In block 1306, the processor determines a set of eigenvectors associated with the set of data windows by performing principal component analysis on a set of data points in the set of data windows. The processor can estimate a covariance matrix for each data window, and calculate eigenvalues of the covariance matrix. In some examples, the processor may select the first principal eigenvalue (e.g., the largest eigenvalue) for use in calculating the corresponding first principal eigenvector. The first principal eigenvector of a first data window can characterize a first subspace associated with the first data window, and the first principal eigenvector of the second data window can characterize a second subspace associated with the second data window.

In some examples, the processor may not determine any other eigenvectors of a data window besides the first principal eigenvector. For example, the processor can implement a modified principal component analysis (PCA) technique to determine the first principal eigenvector of the first data window without determining any other eigenvectors of the first data window. Likewise, the processor can determine the first principal eigenvector of the second data window without determining any other eigenvectors of the second data window. This can significantly reduce processing time and consumption of computing resources (e.g., processing power and memory), since the processor only determines the first principal eigenvectors used to implement the rest of the process and avoids determining other eigenvectors that may be extraneous.

In block 1308, the processor determines a set of angle changes between pairs of eigenvectors in the set of eigenvectors. Each of the pairs of eigenvectors corresponds to a respective pair of successive data windows in the set of data windows.

In the example where only the first principal eigenvectors are calculated for the set of data windows, the processor can apply the following equation to determine the angle change:

$$\theta_i = \cos^{-1}\left(\frac{v_{i-1} \cdot v_i}{\|v_{i-1}\|\|v_i\|}\right)$$

where $v_{i-1}$ is the first principal eigenvector of the first data window, $v_i$ is the first principal eigenvector of the second data window, and $\theta_i$ is the angle change.

Figure 14:
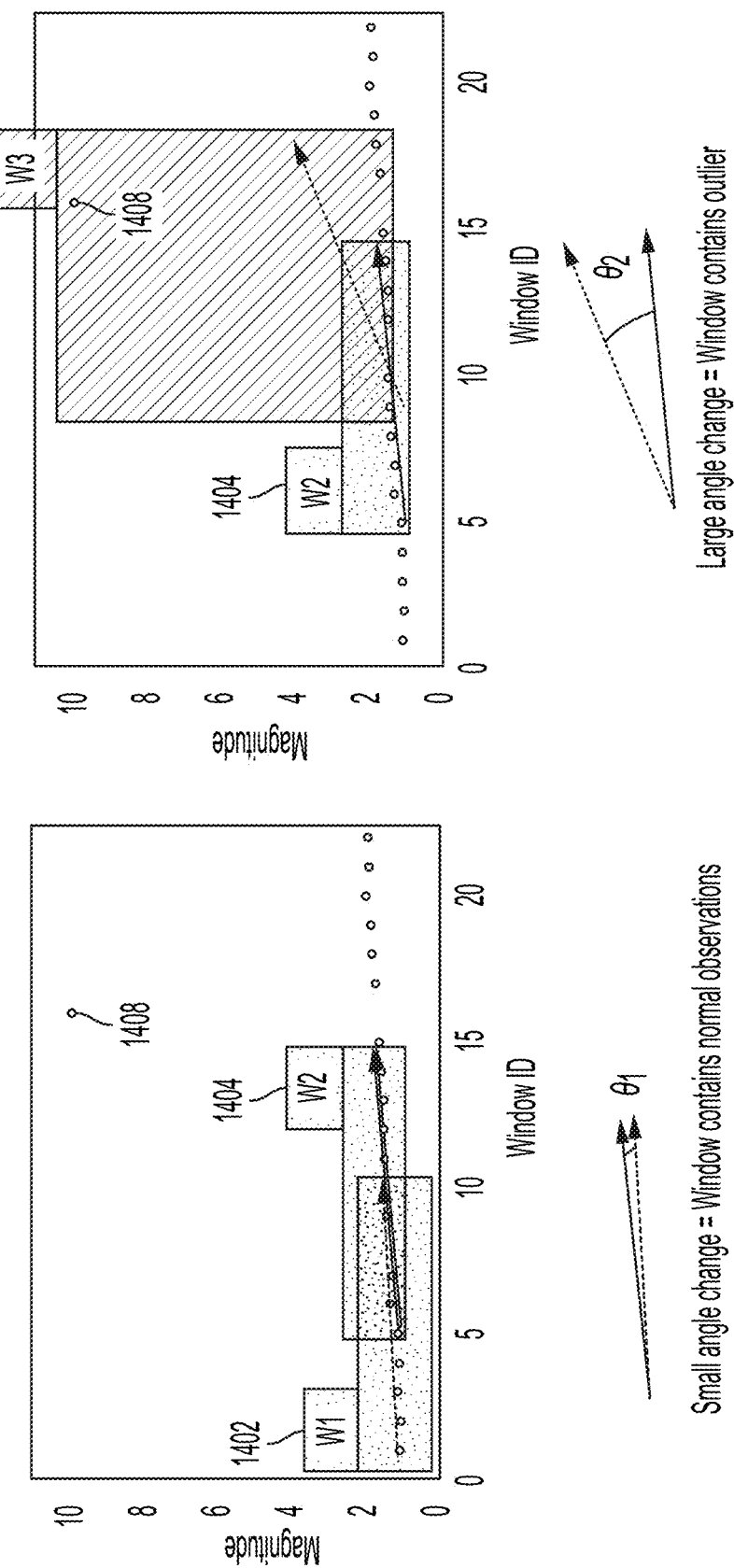
FIG. 14 depicts an example of angle changes in a first principal component over successive windows according to some aspects.

As a particular example, FIG. 14 shows a first data window 1402 with 10 data points, a second data window 1404 with 10 data points, and a third data window 1406 with 10 data points. The first data window 1402 and the second data windows 1404 overlap by 6 data points, and the second data window 1404 and the third data windows 1406 overlap 6 data points. An arrow in the first data window 1402 represents an angle of the first data window 1402, an arrow in the second data window 1404 represents an angle of the second data window 1404, and an arrow in the third data window 1406 represents an angle of the third data window 1406. As shown, the angle change ($\theta_1$) between the angle of the first data window 1402 and the angle of the second date window 1404 is relatively small, which can indicate that one or both of the data windows contain normal observations. In contrast, a large change in these angles can indicate an operational event in one or both of the data windows. For example, the angle change ($\theta_2$) between the angle of the second data window 1404 and the angle of the third data window 1406 is relatively large as a result of an abnormal observation 1408 (a data point value outside a normal range) in the third data window 1406. This large angle change can be indicative of an operational event.

Referring back to FIG. 13, in block 1310, the processor continues by generating a baseline measurement profile by executing an integral transform on the set of angle changes.

Examples of integral transforms can include a Fourier transform, a Laplace transform, a Euler transform, a Gauss transform, etc. Examples of the Fourier transform can include a Fast Fourier Transform (FFT), a discrete Fourier transform (DFT), a discrete-time Fourier transform (DTFT), a short-time Fourier transform (STFT), etc. The baseline measurement profile can include frequencies associated with the set of angle changes.

In an example in the context of an electrical grid, the baseline set of sensor measurements can include voltages associated with a transformer. The voltages can be blocked into successive windows over a 2-hour timeframe. The processor can determine successive eigenvectors associated with the successive windows by applying principal component analysis to the windows, determine angle changes between the successive eigenvectors, and apply an integral transform to the angle changes to generate a measurement profile associated with how the voltage changed over that timeframe. The baseline measurement profile can indicate the frequency components present in the principal component angle changes.

In block 1312, the processor determines a set of absolute angle values corresponding to the set of eigenvectors by comparing each eigenvector to a baseline vector. A unit vector is usable as a baseline vector from which the absolute angle can be determined. In one particular example, the processor can perform this comparison by applying the following equation to determine the absolute angle value:

$$\delta_i = \cos^{-1}\left(\frac{e \cdot v_i}{\|v_i\|}\right)$$

where $v_i$ is the first principal eigenvector of the second data window, e is the baseline unit vector, and $\delta_i$ is the absolute angle.

In block 1314, the processor trains one or more machine-learning models using training data. The training data can include inputs and correlated outputs. The inputs can include the baseline measurement profile, the baseline set of sensor measurements, the set of angle changes, the set of absolute angle values, or any combination of these. The outputs can include certain operational events corresponding to the inputs. In some examples, the processor can generate the training data. After obtaining the training data, the processor can train the one or more machine-learning models based on the training data to generate one or more trained machine-learning models. The one or more machine-learning models can include a gradient boosting model, a random forest model, a decision tree, a neural network, a logistic regression model, or any combination of these. The one or more machine-learning models are trained to be capable of detecting an operational event associated with the same target physical device or another target physical device. The trained models can be capable of detecting the operational event based on new observations from the group of sensors, where the new observations are sensor measurements that were not used to generate the training data.

The one or more machine-learning models can include multiple machine-learning models that may be trained on the same training data using similar or different training approaches. In some instances, the training data is split into a training set and a holdout set for validation. The input training data can include the baseline measurement profile, the input sensor measurements (e.g., voltage, load, and current), the angle changes between first principal eigenvectors, the absolute angle values corresponding to the first principal eigenvectors, or any combination of these. Different types of input training data may be of different importance in training the one or more machine learning models. In some instances, the first-dimensional FFT data in the baseline measurement profile is the most prominent factor. The absolute angle values corresponding to the first principal eigenvectors may also be an important factor.

The sensitivity of the machine-learning models for event detection can be dependent on the sampling period of the sensors. If the measurements are collected at 15-minute intervals, the machine learning models can have better capability to detect higher-frequency irregularities, compared with those trained by measurements collected at longer intervals.

The types of data used for training can also influence the types of operational events that the one or more machine learning models are capable of detecting. In some instances, during the training process, when the one or more machine learning models detect an event from the training data, they can create a flag of that event as well as a precursor flag before the actual event. This allows the detection system to not only detect that an event is happening, but also to predict that an event is going to happen in the future so certain actions can be taken to prevent the event from happening or mitigate the effect of the event.

The one or more machine learning models can be trained to detect and classify operational events associated with the target physical device. In some examples, the accuracy for event detection and classification can be 70%-90%, depending on how the amount of training data is used and how the machine-learning models are trained. In the example of a distribution grid, the one or more machine learning models are trained to detect and classify operational events associated with a transformer, such as a deterioration (DT), electrical tracking (ET), an overload condition, a poor connection (PC), and a premature failure (PF). Electrical tracking is a pre-breakdown phenomenon in solid insulation. It is the decomposition of electrical insulation, for example caused by the passage of electric current or charge, and may result in the progressive formation (usually tree-like) of partially conductive pathways in the insulating material. An overload condition occurs when the load exceeds the capacity of the transformer. Overloading can result in excessive temperatures that prematurely ages the insulation. If a transformer is frequently overloaded, the weakening of the insolation will happen faster. Poor connection refers to loose or broken electric contacts in a transformer, for example, due to broken winding strands, blown fuses, or vibration. Premature failure means a transformer fails to operate much earlier than its life expectancy, which is usually between 25 and 40 years. Overheating and overloading can cause the transformer age prematurely and fail eventually.

Figure 15:
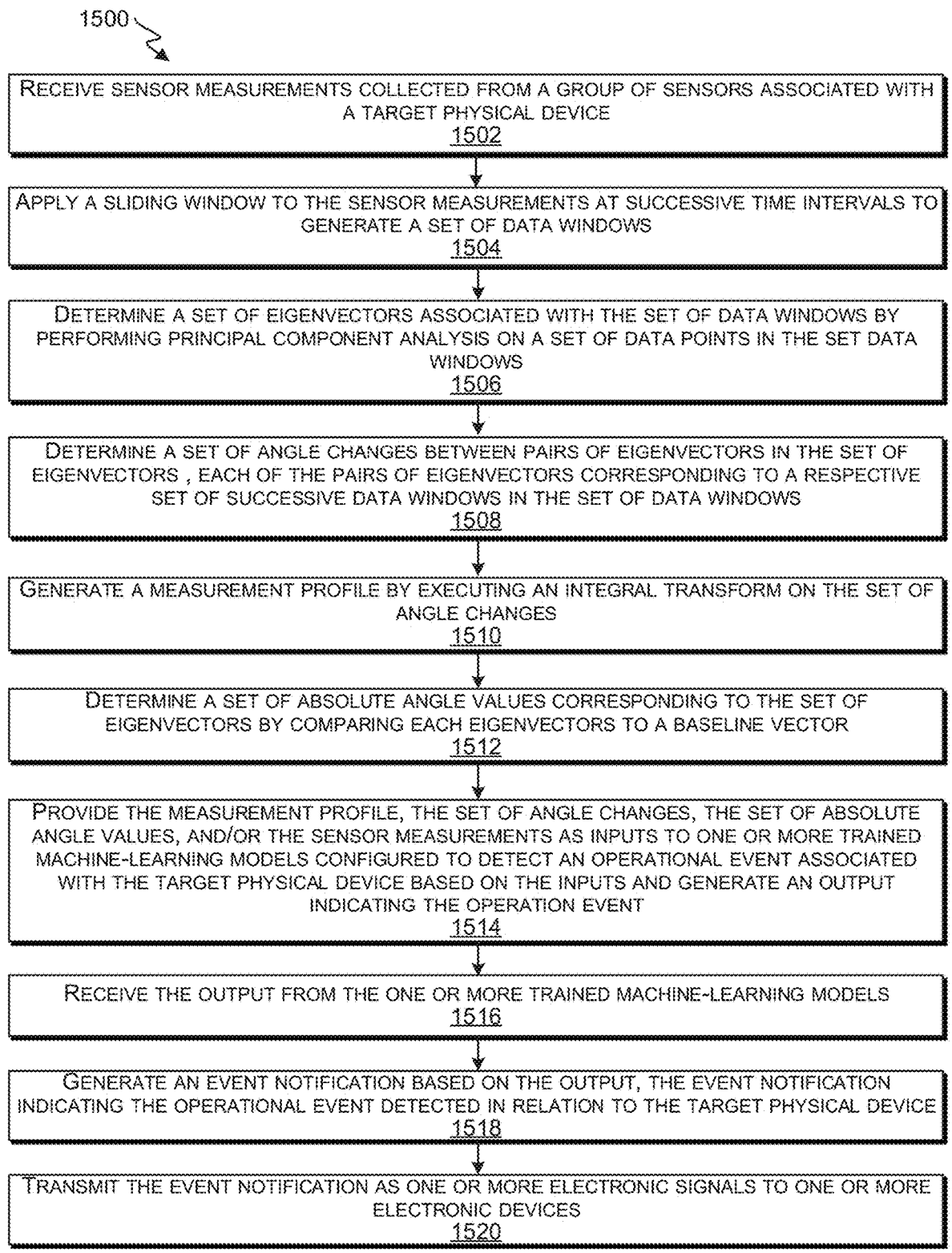
FIG. 15 depicts a flow chart of an example of a process for detecting an operational event associated with a target physical device according to some aspects.

Once a machine-learning model is trained, it can be used to detect operational events associated with the same target physical device or other target physical devices. An example of this process is described below with respect to FIG. 15. Other examples can involve more operations, fewer operations, different operations, or a different order of the operations shown in FIG. 15. In some instances, operations illustrated in blocks 1502-1512 below for the application process can be similar to those in blocks 1302-1312 of FIG. 13 for the training process.

In block 1502, the processor receives sensor measurements collected from a group of sensors associated with a target physical device. The sensor measurements can include data points spanning a period of time. In some examples, the sensor measurements can be static data for root cause analysis or real-time streaming data for real-time detection.

The group of sensors can be included in a group of physical devices. The group of physical devices can be different from the target physical device and configured to be coupled (e.g., electrically or fluidically) to the target physical device. The group of sensors can include any number and combination of the sensor types described above. In some examples, the sensors can be configured for sensing one or more characteristics of the target physical device. This can enable the processor to detect operational events (e.g., anomalies and degradation) associated with the target physical device based on the measurements from the sensors. In some examples, the measurements from the group of sensors can indicate one or more operating conditions of the target physical device because of their proximity and connection to the target physical device.

In block 1504, the processor applies a sliding window to the sensor measurements at successive time intervals to generate a set of data windows. Each data window may have a fixed number of consecutive data points from the sensor measurements. The processor can determine a data window by applying a window function to the sensor measurements. The window function can have a window length constraining the number of consecutive data points in the sensor measurements to be included in a data window. For example, a window length of 9 may generate a data window having 9 consecutive data points from the sensor measurements.

The processor can generate a first data window by applying the window function to the sensor measurements. The first data window can span a first time period and have a predefined number of consecutive data points from the sensor measurements, where the predefined number of consecutive data points depends on the window length associated with the window function. For example, the first data window can span 10 milliseconds (ms) and have 9 data points.

The processor can also generate a second data window by applying the window function to the sensor measurements. The second data window can span a second time period that is subsequent to the first time period, thereby making the second time period more current in time than the first time period. The second data window can also have the predefined number of consecutive data points from the sensor measurements. For example, the second data window can also span 10 milliseconds (ms) and have 9 data points. Thus, the second data window has at least one data point that is different from the data points in the first data window. That is, the second data window includes at least one data point that is not included in the first data window. The second data window may also have at least one data point that is included in the first data window, such that the second data window is partially overlapping with the first data window.

As one example in the context of an electrical distribution grid, a data point can be a voltage associated with (e.g., a voltage draw on) a single transformer, a window can have any suitable timespan from 30 minutes to 2 hours in length, and one data window can be generated at every sampling interval. If the sampling interval is 15 minutes and a data window is 2 hours in length, the data window can include 8 data points. In this scenario, two consecutive data windows can overlap by 7 data points.

In block 1506, the processor determines a set of eigenvectors associated with the set of data windows by performing principal component analysis on a set of data points in the set of data windows. The processor can estimate a covariance matrix for each data window, and calculate eigenvalues of the covariance matrix. In some instance, the processor may select the first principal eigenvalue (e.g., the largest eigenvalue) and calculate the corresponding first principal eigenvector. The first principal eigenvector of a data window can characterize a first subspace associated with the data window.

In some examples, the processor may not determine any other eigenvectors of a data window besides the first principal eigenvector. This can significantly reduce processing time and consumption of computing resources (e.g., processing power and memory), since the processor only determines the first principal eigenvectors used to implement the rest of the process and avoids determining other eigenvectors that may be extraneous.

In block 1508, the processor determines a set of angle changes between pairs of eigenvectors in the set of eigenvectors. Each of the pair of eigenvectors corresponds to a respective pair of successive data windows in the set of data windows. This operation may be performed using the equation described above with respect to block 1308 of FIG. 13.

In block 1510, the processor generates a measurement profile by executing an integral transform on the set of angle changes. The measurement profile can include frequencies associated with the set of angle changes. This operation may be performed using any of the techniques described above with respect to block 1310 of FIG. 13.

In block 1512, the processor determines a set of absolute angle values corresponding to the set of eigenvectors by comparing each eigenvector to a baseline vector. This operation may be performed using any of the techniques described above with respect to block 1312 of FIG. 13.

In block 1514, the processor provides the measurement profile, the set of angle changes, the set of absolute angle values, the sensor measurements, or any combination of these as inputs to one or more trained machine-learning models. The one or more trained machine-learning models can detect an operational event associated with the target physical device based on the inputs and generate an output indicating the operational event.

In some embodiments, the same processor can train the one or more machine-learning models and then use these trained models to generate an output for a specific application. Alternatively, the one or more machine-learning models can be trained by other processors and/or stored on remote systems. The one or more trained machine-learning models can then be accessed (e.g., downloaded or accessed via the Internet) to for use in operation 1514.

The one or more trained machine-learning models can detect an operational event based on one or more of the abovementioned inputs. In some examples, the operational event can include an anomaly associated with the target physical device. The one or more trained machine learning model may also classify the detected operational event. In an example involving electrical distribution transformers, the operational event may be classified as a deterioration (DT), electrical tracking (ET), an overload condition, a poor connection (PC), a premature failure (PF), or another type of event.

In block 1516, the processor receives the output from the one or more trained machine-learning models. In some examples in which the trained machine-learning models are hosted on another computer or system, the processor can receive the output via a network such as a local area network or the Internet.

In block 1518, the processor generates an event notification based on the output. The event notification can indicate the operational event detected in relation to the target physical device.

In block 1520, the processor transmits the event notification as one or more electronic signals to one or more electronic devices. In some instances, the event notification can be transmitted to notify a system administrator so that corrective action can be taken, such as dispatching a maintenance crew to a target physical device (e.g., a distribution transformer). Additionally or alternatively, the detection system can automatically implement one or more countermeasures configured to mitigate a detected operational event associated with the target physical device. For example, the detection system can generate the one or more electronic signals based on the event notification about a detected operational event, where the electronic signals are configured to cause the operational event to be mitigated. In one such example, the electronic signals can be control signals. The detection system can generate and transmit the control signals to the target physical device for causing the target physical device to change an operational setting thereof, in an effort to mitigate the operational event. In another example, the detection system can transmit the control signals to an electronic component associated with the target physical device for causing the electronic component to adjust an operational setting of the target physical device, in an effort to mitigate the operational event. In one such example involving electrical distribution transformers, the electronic component can be a circuit breaker. In an example involving water pumps, the electronic component can be a pressure switch.

In some examples, the one or more electronic signals may indicate a type and severity of the operational event. The detection system can transmit the one or more electronic signals to a remote computing device for causing the remote computing device to assist with mitigating the operational event. For example, the remote computing device can determine a type and severity of an anomaly based on the one or more electronic signals, determine a countermeasure based on the type and severity of the anomaly, and implement the countermeasure in an effort to mitigate the anomaly. In this way, the detection system can automatically take corrective action in response to detected operational events in order to mitigate such problems.

Figure 16:
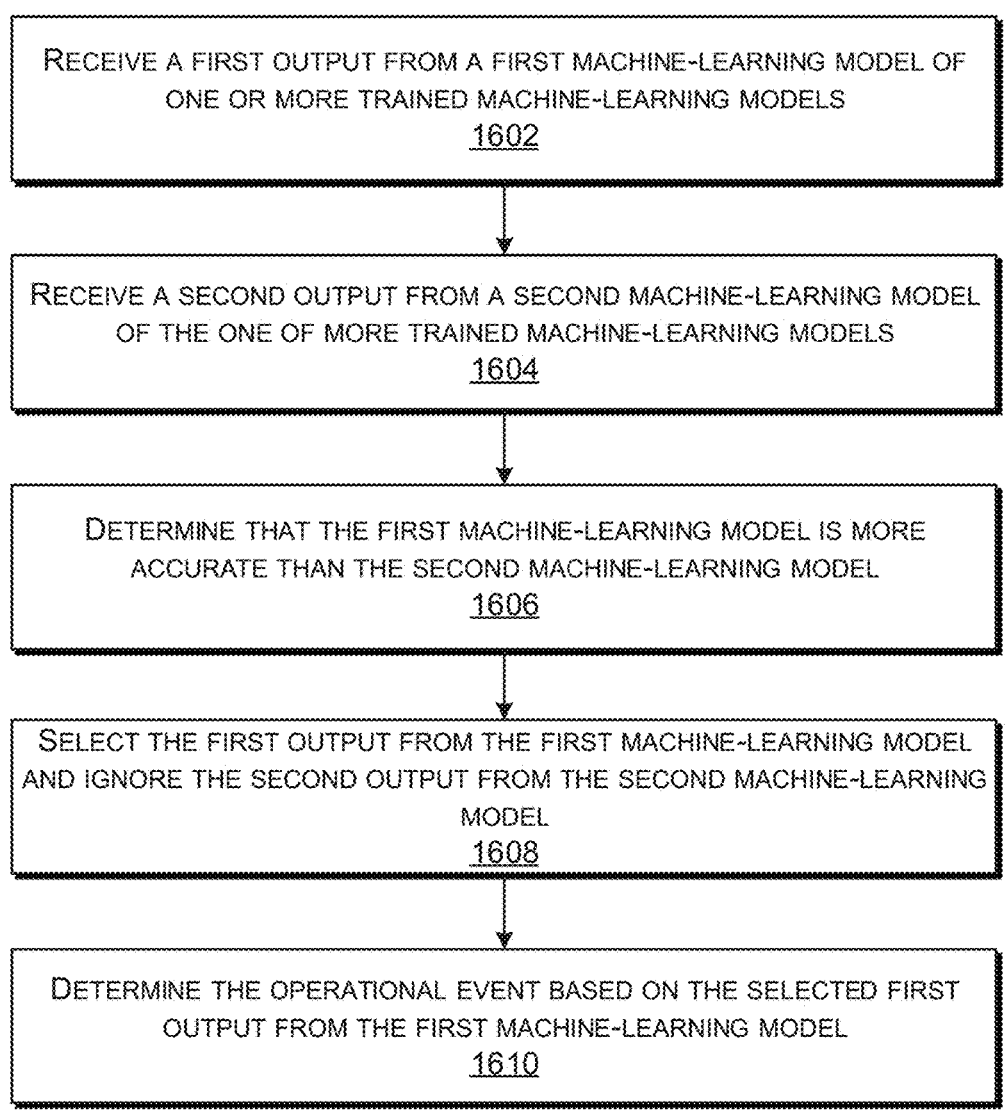
FIG. 16 depicts a flow chart of an example of a process for selecting among outputs from two machine-learning models according to some aspects.

As described earlier, one or more machine-learning models can be trained and used to detect an operational event associated with the target physical device. When the outputs from the one or more trained machine-learning models are different, the processor can determine which output to use for detecting an operational event. FIG. 16 depicts a flow chart of an example of a process for selecting among outputs from two machine-learning models according to some aspects.

In block 1602, the processor receives a first output from a first machine-learning model of the one or more trained machine-learning models. The first machine-learning model can generate the first output based on a measurement profile created by the processor as described in block 1510 of FIG. 15 above.

In block 1604, the processor receives a second output from a second machine-learning model of the one or more trained machine-learning models. The second machine-learning model is separate from the first machine-learning model, and may (or may not) generate the second output based on the same measurement profile created by the processor as described in block 1510 of FIG. 15 above.

When the first output from the first machine-learning model and the second output from the second machine-learning model are sufficiently different from one another (e.g., they output different event classifications, or they output numerical values with differences exceeding a predefined tolerance amount), the processor may decide which output to use.

In block 1606, the processor determines that the first machine-learning model is more accurate than the second machine-learning model. The accuracy levels of different machine-learning models may have been determined during the training and validation phase. In some instances, an average squared error can represent the accuracy of a trained machine-learning model.

In block 1608, based on determining that the first machine-learning model is more accurate than the second machine-learning model, the processor selects the first output from the first machine-learning model and ignores the second output from the second machine-learning model. In alternative examples, the processor may determine that the second output is more accurate than the first output, and select the second output from the second machine-learning model and ignore the first output from the first machine-learning model.

In block 1610, the processor may determine the operational event based on the selected first output from the first machine-learning model. The processor can then generate an event notification based on the determined operational event.

As noted earlier, the systems and process described above can be applied in a variety of contexts. One specific context can be monitoring electrical distribution transformers in an electrical distribution grid.

Figure 17:
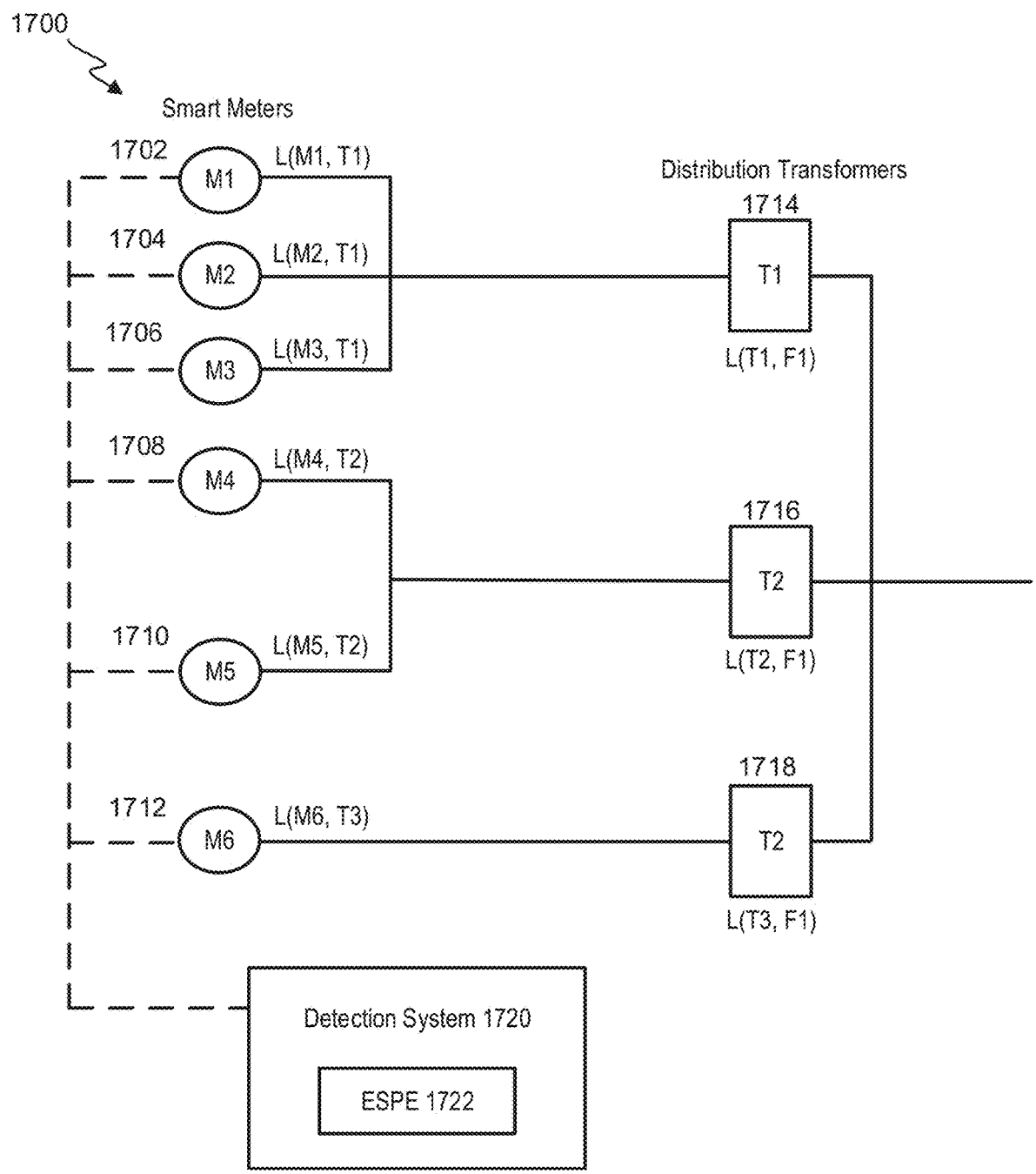
FIG. 17 depicts a block diagram of an example of an electrical distribution grid according to some aspects.

FIG. 17 depicts a block diagram of an example of such an electrical distribution grid according to some aspects. Electric power distribution is the final stage in the delivery of electric power. The distribution system carries electricity from the transmission system to individual users. Distribution substations connect to the transmission system and lower the transmission voltage to medium voltage ranging between 2 kV and 35 kV with the use of transformers. Primary distribution lines carry this medium voltage power to distribution transformers located near an energy user's premises. Distribution transformers again lower the voltage to the utilization voltage used by lighting, industrial equipment, and household appliances.

A distribution transformer or service transformer is a transformer that provides the final voltage transformation in the electrical power distribution system, stepping down the voltage used in the distribution lines to the level used by the end users. These transformers represent service points on the electrical grid that supply voltage to homes and business locations. An average power utility company has hundreds of thousands distribution transformers in service.

A smart meter is an electronic device that records information such as consumption of electric energy, voltage levels, current, and power factor. Smart meters communicate the information to energy users for greater clarity of consumption behavior, and to electricity providers for system monitoring. Smart meters typically record energy in near real-time, and report regularly with short intervals throughout the day.

Smart meters enable two-way communication between the meter and the service provider's systems. Communications from the meter to the service provider may be wireless or via wired connections using techniques such as power-line communication (PLC). Wireless communication options may include cellular communications, Wi-Fi, wireless ad hoc networks over Wi-Fi, wireless mesh networks, low power long-range (LoRa) wireless, ZigBee (low power, low data-rate wireless), and Wireless Smart Utility Networks (Wi-SUN).

In FIG. 17, data collected from smart meters M1-M6 can be used to determine a combined voltage value for their corresponding distribution transformers T1-T3. For example, the smart meters M1 1702, M2 1704, and M3 1706 can provide individual voltage values that may be combined together to determine a combined voltage value for the corresponding distribution transformer T1 1714. Similarly, the smart meters M4 1708 and M5 1710 can provide individual voltage values that may be combined together to determine a combined voltage value for the corresponding distribution transformer T2 1716. Smart meter M6 1712 can provide individual voltage values to determine a voltage value for the corresponding distribution transformer T3 1718. This may be accomplished by matching meter data to the servicing transformer using Customer Information System (CIS), Geographic Information System (GIS), and/or Network data. CIS may store user information including meter number, address, GIS locations, corresponding transformer, service dates, and install dates. GIS may store location information including additional attributes such as transformer configuration, rated kVA, installation date, critical care flags, and work order information. Network data may include electric circuit data in hierarchical format describing the location of assets, referred to as nodes, in an electric circuit. The network data can be used to determine the rank and order of transformers and other electrical assets in an electrical circuit.

In some examples, a detection system 1720 (e.g., diagnostic system) can be coupled to some or all of the smart meters 1702-1712 for receiving meter data therefrom. The detection system 1720 can receive the meter data directly or indirectly (e.g., via data collectors or from a database) from the smart meters 1702-1712. The detection system 1720 can be located at a service center for the electrical distribution grid or in any other suitable location. In some instances, the detection system 1720 can include an Event Stream Processing Engine (ESPE) 1722 for processing all the meter data with the CIS data, GIS data, and network data associated with the electrical distribution grid.

In some instances, the detection system 1720 can group together information relating to adjacent distribution transformers using the hierarchy structures defined by network design. In FIG. 17, transformers T1 1714, T2 1716, and T3 1718 can be grouped together since they are connected to the same primary feeder. The meter data (e.g., voltages, kilowatts, and amperages) collected from smart meters can be aggregated and allocated to their respective transformers, and a data model for the group of transformers T1-T3 can be generated. This data model can then be used by the detection system 1720 for subspace tracking and principal component analysis described in FIG. 15 to analyze voltages at different transformers.

In some instances, the detection system 1720 can implement principal component analysis with respect to two or more different data windows, such as 12-hour windows, 24-hour windows, and 36-hour window, for a group of transformers. The processor can determine eigenvectors associated with each data window. The eigenvectors can be used to calculate absolute angle values and angle changes for each window per transformer. The angle change can indicate a voltage stability value, which may be produced in real time. The voltage stability value greater than 0.01 can indicate an unstable voltage. An absolute angle value can also indicate a voltage variance between the grouped transformers. Combining the two as alerts can identify circuit areas that are in distress.

Figure 18:
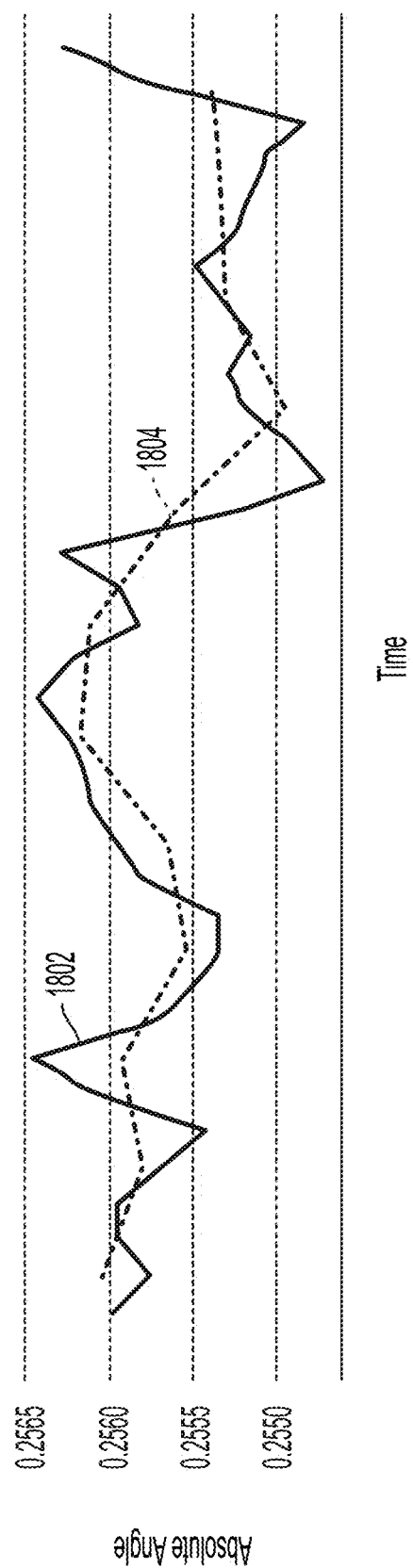
FIG. 18 depicts a graph of an example of absolute angle values using two different data windows according to some aspects.

Some specific examples of situations in which changes in voltage stability values can serve as a meaningful detection mechanism are illustrated in FIGS. 18-21. FIG. 18 depicts a graph of an example of absolute angle values computed using two different data windows according to some aspects. Line 1802 represents absolute angle values associated with a transformer and generated using a 24-hour window. That is, each data point on the line can correspond to a single window that spanned a 24-hour timeframe. Line 1804 represents absolute angle values associated with the transformer and generated using 48-hour windows. From these values, voltage stability values (e.g., angle changes) may be estimated.

Figure 19:
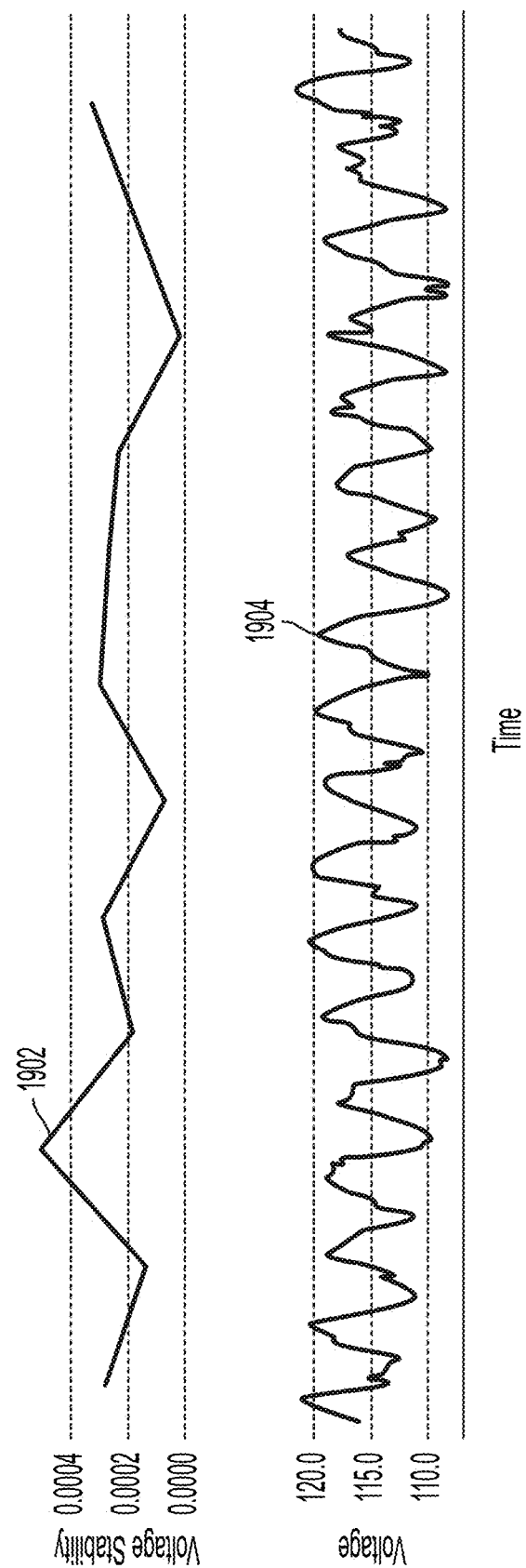
FIG. 19 depicts graphs showing examples of voltage stability and voltage at a transformer during a first time period according to some aspects.

FIG. 19 depicts graphs showing examples of voltage stability and voltage at a transformer during a first time period according to some aspects. It depicts voltage readings of the transformer one day before a voltage anomaly. Graph 1902 is the voltage stability, which is the calculated difference between the absolute angle values (e.g., those measured in 24-hour windows and those measured in 48-hour windows). The voltage stability in this example is measured in the hundred thousandths (0.00001). As shown, the voltage stability remains within a relatively tight band when the transformer is operating properly. Graph 1904 shows hourly voltages. The hourly voltages also remain within a relatively small range between about 110 V and about 120 V.

Figure 20:
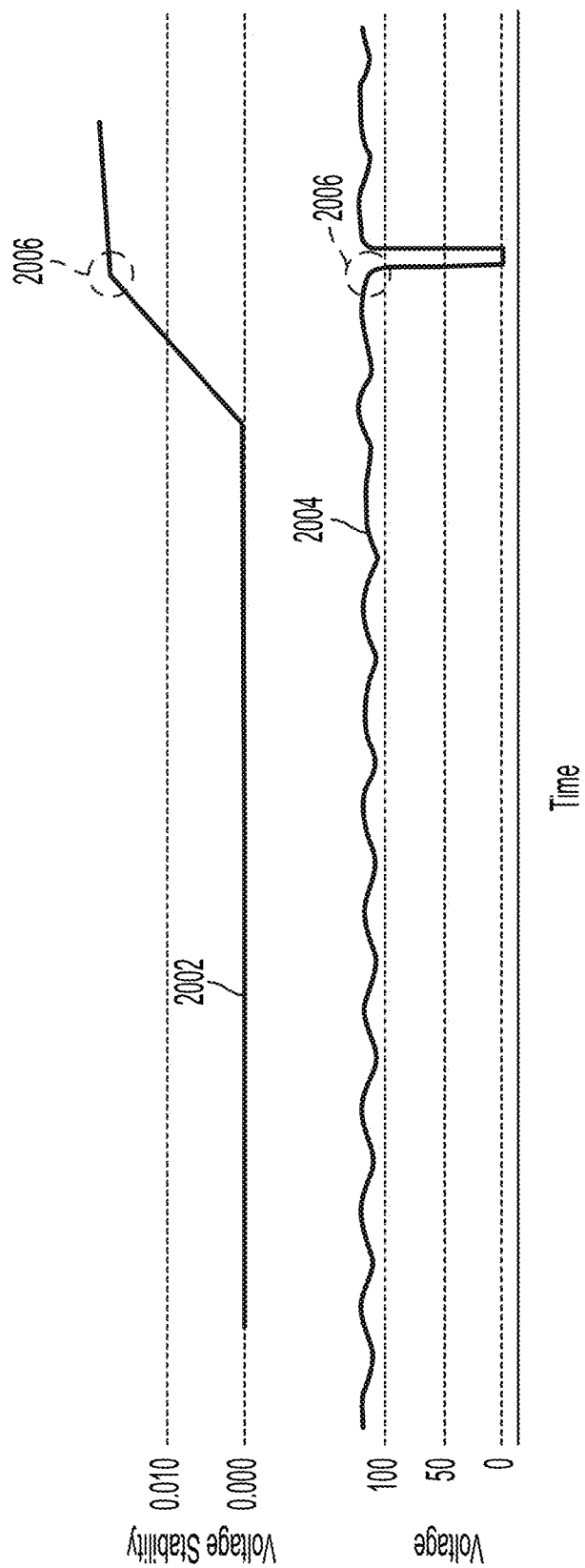
FIG. 20 depicts graphs showing examples of voltage stability and voltage at a transformer during a second time period according to some aspects.

FIG. 20 depicts graphs showing examples of voltage stability and voltage at a transformer during a second time period according to some aspects. During the second day, the voltage stability illustrated by graph 2002 increases from 0.0001 to 0.02, while during that time the voltage value illustrated by graph 2004 does not change until the voltage reading changes significantly with a full-blown voltage event at point 2006. FIG. 20 shows that the voltage stability value can indicate the event approximately 3 hours prior to the event occurring. Thus, a change of the voltage stability is a precursor indicative of a more significant event in this example. The voltage stability anomaly is a precursor that is detectable prior to significant voltage changes being observed. Thus, such anomalies can be used to predict the onset of operational events, for example before those operational events become detectable using other techniques like monitoring voltage. Additionally, in some situations the operational events may be relatively imperceptible or undetectable using other techniques, like monitoring voltage, apparent power, or energy consumption. But some examples described herein can still detect operational events (e.g., based on voltage stability) where other techniques may fail to do so.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including instructions that are executable by the one or more processors for causing the one or more processors to:
receive sensor measurements collected from a plurality of sensors associated with a target physical device, the sensor measurements including data points spanning a period of time;
apply a sliding window to the sensor measurements at successive time intervals to generate a plurality of data windows, each data window in the plurality of data windows having a fixed number of consecutive data points from the sensor measurements;
determine a plurality of eigenvectors associated with the plurality of data windows by performing principal component analysis on a plurality of data points in the plurality of data windows;
determine a plurality of angle changes between pairs of eigenvectors in the plurality of eigenvectors, each of the pairs of eigenvectors corresponding to a respective pair of successive data windows in the plurality of data windows;
generate a measurement profile by executing an integral transform on the plurality of angle changes, the measurement profile including frequencies associated with the plurality of angle changes;
provide the measurement profile as an input to one or more trained machine-learning models, the one or more trained machine-learning models being configured to detect an operational event associated with the target physical device based on the measurement profile and generate an output indicating the operational event; and
receive the output from the one or more trained machine-learning models;
generate an event notification based on the output, the event notification indicating the operational event detected in relation to the target physical device; and
transmit the event notification as one or more electronic signals to one or more electronic devices.

2. The system of claim 1, further comprising a plurality of physical devices that include the plurality of sensors, wherein the plurality of physical devices are different from the target physical device and configured to be electrically or fluidically coupled to the target physical device.

3. The system of claim 2, wherein:
the plurality of physical devices are electrical meters configured to be connected to an electrical grid, wherein the electrical meters are usable to monitor power consumption by residential properties or commercial properties;
the plurality of sensors are voltage sensors or current sensors of the electrical meters;
the target physical device is a transformer of the electrical grid; and
the operational event includes an anomaly associated with the transformer.

4. The system of claim 1, wherein the one or more memory devices further include instructions that are executable by the one or more processors for causing the one or more processors to, prior to receiving the sensor measurements:
receive a baseline set of sensor measurements collected from the plurality of sensors associated with the target physical device;
apply the sliding window to the baseline set of sensor measurements at successive time intervals to generate a set of data windows, each data window in the set of data windows having the fixed number of consecutive data points from the baseline set of sensor measurements;
determine a set of eigenvectors associated with the set of data windows by performing principal component analysis on a set of data points in the set of data windows;
determine a set of angle changes between pairs of eigenvectors in the set of eigenvectors, each of the pairs of eigenvectors corresponding to a respective pair of successive data windows in the set of data windows;
generate a baseline measurement profile by executing the integral transform on the set of angle changes, the baseline measurement profile including frequencies associated with the set of angle changes; and
train one or more machine-learning models using the baseline measurement profile as an input and observed operational events associated with the baseline set of sensor measurements as outputs, to generate the one or more trained machine-learning models.

5. The system of claim 4, wherein the one or more memory devices further include instructions that are executable by the one or more processors for causing the one or more processors to train the one or more machine-learning models using the baseline set of sensor measurements and the set of angle changes as inputs, in addition to the baseline measurement profile.

6. The system of claim 4, wherein the one or more memory devices further include instructions that are executable by the one or more processors for causing the one or more processors to:
determine a set of absolute angle values corresponding to the set of eigenvectors by comparing each eigenvector in the set of eigenvectors to a baseline vector; and
train the one or more machine-learning models using the baseline measurement profile and the set of absolute angle values as inputs, to generate the one or more trained machine-learning models.

7. The system of claim 1, wherein the one or more memory devices further include instructions that are executable by the one or more processors for causing the one or more processors to:
provide the measurement profile, the plurality of angle changes, and the sensor measurements as inputs to the one or more trained machine-learning models, the one or more trained machine-learning models being configured to detect the operational event based on the inputs.

8. The system of claim 1, wherein the one or more memory devices further include instructions that are executable by the one or more processors for causing the one or more processors to:
determine a plurality of absolute angle values corresponding to the plurality of eigenvectors by comparing each eigenvector in the plurality of eigenvectors to a baseline vector; and
provide the measurement profile and the plurality of absolute angle values as inputs to the one or more trained machine-learning models, the one or more trained machine-learning models being configured to detect the operational event based on the measurement profile and the plurality of absolute angle values.

9. The system of claim 1, wherein the one or more trained machine-learning models include a neural network or a decision tree.

10. The system of claim 1, wherein the operational event includes an anomaly associated with the target physical device.

11. The system of claim 10, wherein the anomaly includes a failure of the target physical device, an operational error in the target physical device, or an overloading condition on the target physical device.

12. The system of claim 10, wherein the one or more memory devices further include instructions that are executable by the one or more processors for causing the one or more processors to:
in response to detecting the anomaly, transmit the one or more electronic signals as one or more electronic communications over a network to a control system associated with the target physical device, the control system being configured to receive the one or more electronic communications and responsively execute a mitigation operation for mitigating the anomaly.

13. The system of claim 1, wherein the one or more memory devices further include instructions that are executable by the one or more processors for causing the one or more processors to, after providing the measurement profile as input to the one or more trained machine-learning models:
receive a first output from a first machine-learning model of the one or more trained machine-learning models, the first output being generated by the first machine-learning model based on the measurement profile;
receive a second output from a second machine-learning model of the one or more trained machine-learning models, the second machine-learning model being separate from the first machine-learning model, and the second output being generated by the second machine-learning model based on the measurement profile;
determine that the first machine-learning model is more accurate than the second machine-learning model;
based on determining that the first machine-learning model is more accurate than the second machine-learning model, select the first output from the first machine-learning model and ignore the second output from the second machine-learning model; and
determine the operational event based on the first output.

14. A method comprising:
receiving, by a processor, sensor measurements collected from a plurality of sensors associated with a target physical device, the sensor measurements including data points spanning a period of time;
applying, by a processor, a sliding window to the sensor measurements at successive time intervals to generate a plurality of data windows, each data window in the plurality of data windows having a fixed number of consecutive data points from the sensor measurements;
determining, by a processor, a plurality of eigenvectors associated with the plurality of data windows by performing principal component analysis on a plurality of data points in the plurality of data windows;
determining, by a processor, a plurality of angle changes between pairs of eigenvectors in the plurality of eigenvectors, each of the pairs of eigenvectors corresponding to a respective pair of successive data windows in the plurality of data windows;
generating, by a processor, a measurement profile by executing an integral transform on the plurality of angle changes, the measurement profile including frequencies associated with the plurality of angle changes;
providing, by a processor, the measurement profile as an input to one or more trained machine-learning models, the one or more trained machine-learning models being configured to detect an operational event associated with the target physical device based on the measurement profile and generate an output indicating the operational event; and
receiving, by a processor, the output from the one or more trained machine-learning models;
generating, by a processor, an event notification based on the output, the event notification indicating the operational event detected in relation to the target physical device; and
transmitting, by a processor, the event notification as one or more electronic signals to one or more electronic devices.

15. The method of claim 14, wherein the plurality of sensors is included in a plurality of physical devices, wherein the plurality of physical devices are different from the target physical device and configured to be electrically or fluidically coupled to the target physical device.

16. The method of claim 15, wherein:
the plurality of physical devices are electrical meters configured to be connected to an electrical grid, wherein the electrical meters are usable to monitor power consumption by residential properties or commercial properties;
the plurality of sensors are voltage sensors or current sensors of the electrical meters;
the target physical device is a transformer of the electrical grid; and
the operational event includes an anomaly associated with the transformer.

17. The method of claim 14, further comprising, prior to receiving the sensor measurements:
receiving a baseline set of sensor measurements collected from the plurality of sensors associated with the target physical device;
applying the sliding window to the baseline set of sensor measurements at successive time intervals to generate a set of data windows, each data window in the set of data windows having the fixed number of consecutive data points from the baseline set of sensor measurements;

determining a set of eigenvectors associated with the set of data windows by performing principal component analysis on a set of data points in the set of data windows;

determining a set of angle changes between pairs of eigenvectors in the set of eigenvectors, each of the pairs of eigenvectors corresponding to a respective pair of successive data windows in the set of data windows;

generating a baseline measurement profile by executing the integral transform on the set of angle changes, the baseline measurement profile including frequencies associated with the set of angle changes; and training one or more machine-learning models using the baseline measurement profile as an input and observed operational events associated with the baseline set of sensor measurements as outputs, to generate the one or more trained machine-learning models.

18. The method of claim 17, further comprising training the one or more machine-learning models using the baseline set of sensor measurements and the set of angle changes as inputs, in addition to the baseline measurement profile.

19. The method of claim 17, further comprising:
determining a set of absolute angle values corresponding to the set of eigenvectors by comparing each eigenvector in the set of eigenvectors to a baseline vector; and
training the one or more machine-learning models using the baseline measurement profile and the set of absolute angle values as inputs, to generate the one or more trained machine-learning models.

20. The method of claim 14, further comprising:
providing the measurement profile, the plurality of angle changes, and the sensor measurements as inputs to the one or more trained machine-learning models, the one or more trained machine-learning models being configured to detect the operational event based on the inputs.

21. The method of claim 14, further comprising:
determining a plurality of absolute angle values corresponding to the plurality of eigenvectors by comparing each eigenvector in the plurality of eigenvectors to a baseline vector; and
providing the measurement profile and the plurality of absolute angle values as inputs to the one or more trained machine-learning models, the one or more trained machine-learning models being configured to detect the operational event based on the measurement profile and the plurality of absolute angle values.

22. The method of claim 14, wherein the one or more trained machine-learning models include a neural network or a decision tree.

23. The method of claim 14, wherein the operational event includes an anomaly associated with the target physical device.

24. The method of claim 23, wherein the anomaly includes a failure of the target physical device, an operational error in the target physical device, or an overloading condition on the target physical device.

25. The method of claim 23, further comprising:
in response to detecting the anomaly, transmitting the one or more electronic signals as one or more electronic communications over a network to a control system associated with the target physical device, the control system being configured to receive the one or more electronic communications and responsively execute a mitigation operation for mitigating the anomaly.

26. The method of claim 14, further comprising, after providing the measurement profile as input to the one or more trained machine-learning models:
receiving a first output from a first machine-learning model of the one or more trained machine-learning models, the first output being generated by the first machine-learning model based on the measurement profile;
receiving a second output from a second machine-learning model of the one or more trained machine-learning models, the second machine-learning model being separate from the first machine-learning model, and the second output being generated by the second machine-learning model based on the measurement profile;
determining that the first machine-learning model is more accurate than the second machine-learning model;
based on determining that the first machine-learning model is more accurate than the second machine-learning model, selecting the first output from the first machine-learning model and ignore the second output from the second machine-learning model; and
determining the operational event based on the first output.

27. A non-transitory computer-readable medium comprising program code that is executable by one or more processors for causing the one or more processors to:
receive sensor measurements collected from a plurality of sensors associated with a target physical device, the sensor measurements including data points spanning a period of time;
apply a sliding window to the sensor measurements at successive time intervals to generate a plurality of data windows, each data window in the plurality of data windows having a fixed number of consecutive data points from the sensor measurements;
determine a plurality of eigenvectors associated with the plurality of data windows by performing principal component analysis on a plurality of data points in the plurality of data windows;
determine a plurality of angle changes between pairs of eigenvectors in the plurality of eigenvectors, each of the pairs of eigenvectors corresponding to a respective pair of successive data windows in the plurality of data windows;
generate a measurement profile by executing an integral transform on the plurality of angle changes, the measurement profile including frequencies associated with the plurality of angle changes;
provide the measurement profile as an input to one or more trained machine-learning models, the one or more trained machine-learning models being configured to detect an operational event associated with the target physical device based on the measurement profile and generate an output indicating the operational event; and
receive the output from the one or more trained machine-learning models;
generate an event notification based on the output, the event notification indicating the operational event detected in relation to the target physical device; and
transmit the event notification as one or more electronic signals to one or more electronic devices.

28. The non-transitory computer-readable medium of claim 27, further comprising program code that is executable by one or more processors for causing the one or more processors to:

determine a plurality of absolute angle values corresponding to the plurality of eigenvectors by comparing each eigenvector in the plurality of eigenvectors to a baseline vector; and provide the measurement profile, sensor measurements, the plurality of angle changes, and the plurality of absolute angle values as inputs to the one or more trained machine-learning models, the one or more trained machine-learning models being configured to detect the operational event based on the inputs.

29. The non-transitory computer-readable medium of claim 27, further comprising program code that is executable by one or more processors for causing the one or more processors to, prior to receiving the sensor measurements:

receive a baseline set of sensor measurements collected from the plurality of sensors associated with the target physical device;

apply the sliding window to the baseline set of sensor measurements at successive time intervals to generate a set of data windows, each data window in the set of data windows having the fixed number of consecutive data points from the baseline set of sensor measurements;

determine a set of eigenvectors associated with the set of data windows by performing principal component analysis on a set of data points in the set of data windows;

determine a set of absolute angle values corresponding to the set of eigenvectors by comparing each eigenvector in the set of eigenvectors to a baseline vector;

determine a set of angle changes between pairs of eigenvectors in the set of eigenvectors, each of the pairs of eigenvectors corresponding to a respective pair of successive data windows in the set of data windows;

generate a baseline measurement profile by executing the integral transform on the set of angle changes, the baseline measurement profile including frequencies associated with the set of angle changes; and train one or more machine-learning models using the baseline measurement profile, the baseline set of sensor measurements, the set of absolute angle values, and the set of angle changes as inputs and observed operational events associated with the baseline set of sensor measurements as outputs, to generate the one or more trained machine-learning models.

30. The non-transitory computer-readable medium of claim 27, further comprising program code that is executable by one or more processors for causing the one or more processors to, after providing the measurement profile as input to the one or more trained machine-learning models:

receive a first output from a first machine-learning model of the one or more trained machine-learning models, the first output being generated by the first machine-learning model based on the measurement profile;

receive a second output from a second machine-learning model of the one or more trained machine-learning models, the second machine-learning model being separate from the first machine-learning model, and the second output being generated by the second machine-learning model based on the measurement profile;

determine that the first machine-learning model is more accurate than the second machine-learning model;

based on determining that the first machine-learning model is more accurate than the second machine-learning model, select the first output from the first machine-learning model and ignore the second output from the second machine-learning model; and determine the operational event based on the first output.

\* \* \* \* \*